United States Patent
Giunta et al.

(10) Patent No.: US 12,472,846 B2
(45) Date of Patent: Nov. 18, 2025

(54) THERMAL MANAGEMENT SYSTEM FOR ELECTRIFIED VEHICLE USING POWER ELECTRONICS HEAT FOR HEATING A BATTERY

(71) Applicant: Ford Global Technologies, LLC, Dearborn, MI (US)

(72) Inventors: Michael Joseph Giunta, Livonia, MI (US); Christian Brent Schoeneman, Southgate, MI (US); Todd Louis Wenzel, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 17/967,278

(22) Filed: Oct. 17, 2022

(65) Prior Publication Data
US 2024/0123869 A1    Apr. 18, 2024

(51) Int. Cl.
*B60H 1/00* (2006.01)
*B60L 58/27* (2019.01)

(52) U.S. Cl.
CPC .......... *B60L 58/27* (2019.02); *B60H 1/00021* (2013.01); *B60H 1/00278* (2013.01); *B60H 2001/00114* (2013.01); *B60H 2001/00171* (2013.01); *B60Y 2400/112* (2013.01)

(58) Field of Classification Search
CPC . B60L 58/27; B60H 1/00021; B60H 1/00278; B60H 1/00885; B60H 1/143; B60H 2001/00114; B60H 2001/00171; B60Y 2400/112
See application file for complete search history.

(56) References Cited

U.S. PATENT DOCUMENTS

| | | | |
|---|---|---|---|
| 6,357,541 B1 * | 3/2002 | Matsuda | B60K 11/02 903/905 |
| 9,631,547 B2 | 4/2017 | Porras et al. | |
| 9,701,215 B1 * | 7/2017 | Kim | B60L 58/33 |
| 10,875,381 B2 | 12/2020 | Schoeneman et al. | |
| 10,967,702 B2 | 4/2021 | Mancini et al. | |
| 11,338,647 B1 * | 5/2022 | Johnston | B60H 1/32011 |
| 2008/0251235 A1 * | 10/2008 | Zhou | B60L 50/51 165/59 |
| 2013/0111932 A1 * | 5/2013 | Mishima | B60L 58/27 62/159 |
| 2014/0266038 A1 * | 9/2014 | Gibeau | B60L 53/52 320/109 |
| 2015/0101789 A1 * | 4/2015 | Enomoto | B60H 1/039 236/35 |

(Continued)

*Primary Examiner* — Travis Ruby
(74) *Attorney, Agent, or Firm* — David B. Kelley; Carlson, Gaskey & Olds, P.C.

(57) ABSTRACT

An exemplary thermal management system includes, among other things, a heater loop, a battery loop, a radiator loop, and a power electronics loop operating within a glycol system. A first valve is in fluid communication with one or more of the heater loop, the battery loop, the radiator loop, and the power electronics loop. A second valve is in fluid communication with one or more of the heater loop, the battery loop, the radiator loop, and the power electronics loop. The second valve is fluidly connected to the first valve to provide at least one operational condition where waste heat from power electronics in the power electronics loop is used to heat a battery in the battery loop.

20 Claims, 34 Drawing Sheets

(56) References Cited

U.S. PATENT DOCUMENTS

| | | | |
|---|---|---|---|
| 2015/0129161 A1* | 5/2015 | Nishikawa | B60H 1/00885 62/243 |
| 2015/0217622 A1* | 8/2015 | Enomoto | F16K 11/076 62/244 |
| 2016/0023532 A1* | 1/2016 | Gauthier | H01M 10/6568 62/502 |
| 2016/0031291 A1* | 2/2016 | Enomoto | B60K 11/02 62/189 |
| 2016/0107501 A1* | 4/2016 | Johnston | B60H 1/00278 165/41 |
| 2016/0107502 A1* | 4/2016 | Johnston | B60H 1/00921 165/202 |
| 2016/0107503 A1* | 4/2016 | Johnston | B60H 1/00278 165/202 |
| 2016/0107504 A1* | 4/2016 | Johnston | B60H 1/32284 165/202 |
| 2016/0107505 A1* | 4/2016 | Johnston | B60H 1/00278 165/202 |
| 2016/0107506 A1* | 4/2016 | Johnston | B60H 1/00278 165/202 |
| 2016/0107507 A1* | 4/2016 | Johnston | B60H 1/00278 62/160 |
| 2016/0107508 A1* | 4/2016 | Johnston | B60H 1/00278 237/12.3 A |
| 2016/0153343 A1* | 6/2016 | Kakehashi | B60H 1/00885 123/41.31 |
| 2016/0178253 A1* | 6/2016 | Katoh | B60H 1/32284 62/185 |
| 2016/0318370 A1* | 11/2016 | Rawlinson | B60H 1/32281 |
| 2016/0318409 A1* | 11/2016 | Rawlinson | B60L 1/003 |
| 2018/0117985 A1* | 5/2018 | Kim | B60H 3/024 |
| 2018/0154782 A1 | 6/2018 | Lee | |
| 2018/0229620 A1* | 8/2018 | Yamanaka | B60K 6/48 |
| 2018/0236842 A1* | 8/2018 | Allgaeuer | B60H 1/00278 |
| 2019/0047352 A1* | 2/2019 | Kim | B60H 1/00278 |
| 2019/0168569 A1* | 6/2019 | Lee | B60L 58/26 |
| 2019/0176572 A1* | 6/2019 | Kim | B60H 1/00428 |
| 2019/0275858 A1* | 9/2019 | Seki | B60H 1/00907 |
| 2019/0291710 A1* | 9/2019 | Ogura | B60W 20/00 |
| 2019/0308489 A1* | 10/2019 | Spies | F25B 41/35 |
| 2019/0375270 A1* | 12/2019 | Boger | B60H 1/00392 |
| 2020/0009941 A1* | 1/2020 | Aikawa | B60H 1/06 |
| 2020/0047586 A1* | 2/2020 | Gonze | B60H 1/00385 |
| 2021/0080027 A1 | 3/2021 | Schoeneman et al. | |
| 2021/0300146 A1* | 9/2021 | Ishizeki | B60H 1/00921 |
| 2021/0309075 A1* | 10/2021 | Hasegawa | H01M 10/633 |
| 2021/0379962 A1* | 12/2021 | Kim | B60H 1/00007 |
| 2021/0402844 A1* | 12/2021 | Kim | B60H 1/3227 |
| 2022/0016955 A1* | 1/2022 | Kim | B60H 1/03 |
| 2022/0072927 A1* | 3/2022 | Wang | B60H 1/00921 |
| 2022/0126646 A1* | 4/2022 | He | B60H 1/00278 |
| 2022/0134839 A1* | 5/2022 | He | B60H 1/00485 165/203 |
| 2022/0176774 A1* | 6/2022 | Tang | B60H 1/3227 |
| 2022/0227205 A1* | 7/2022 | Mitani | H01M 10/625 |
| 2022/0234420 A1* | 7/2022 | Hall | B60H 1/143 |
| 2022/0281285 A1* | 9/2022 | Kim | B60H 1/00278 |
| 2022/0314737 A1* | 10/2022 | Hwang | F01P 5/10 |
| 2022/0324294 A1* | 10/2022 | Kim | B60H 1/00921 |
| 2024/0123869 A1* | 4/2024 | Giunta | B60L 1/003 |

* cited by examiner

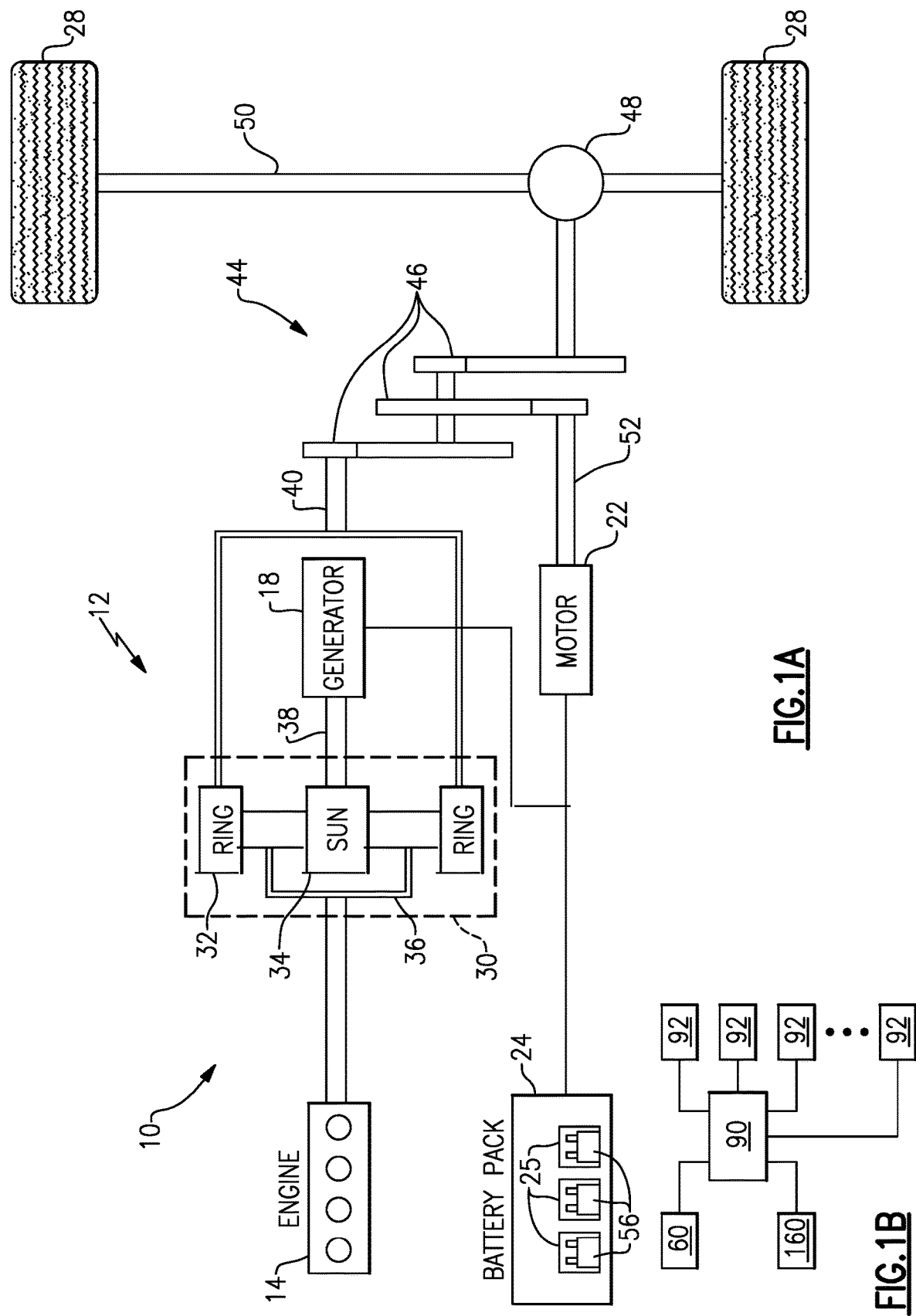

THERMAL MANAGEMENT SYSTEM FOR ELECTRIFIED VEHICLE USING POWER ELECTRONICS HEAT FOR HEATING A BATTERY

TECHNICAL FIELD

This disclosure relates to a thermal management system for an electrified vehicle, and more particularly to a thermal management system that uses waste heat from power electronics to heat a battery independently or additively through a PTC heater to heat a cabin area.

BACKGROUND

An electrified vehicle includes a high voltage traction battery pack that powers electric machines and other electrical loads of the electrified vehicle. It is challenging to manage heat transfer between different groups of components in the electrified vehicle without the addition of a significant number of heat exchangers and/or a plurality of valve systems.

SUMMARY

A thermal management system according to an exemplary aspect of the present disclosure includes, among other things, a heater loop, a battery loop, a radiator loop, and a power electronics loop operating within a glycol system. A first valve is in fluid communication with one or more of the heater loop, the battery loop, the radiator loop, and the power electronics loop. A second valve is in fluid communication with one or more of the heater loop, the battery loop, the radiator loop, and the power electronics loop. The second valve is fluidly connected to the first valve to provide at least one operational condition where waste heat from power electronics in the power electronics loop is used to heat a battery in the battery loop.

In a further non-limiting embodiment of the foregoing system, the at least one operational condition comprises a plurality of operational conditions, and including a system controller that controls the first valve and the second valve to manage heat transfer for the plurality of operational conditions.

In a further non-limiting embodiment of any of the foregoing systems, the plurality of operational conditions includes at least a first operational condition where the waste heat from the power electronics is used to heat the battery independently or additively through a PTC heater to heat a cabin area.

In a further non-limiting embodiment of any of the foregoing systems, wherein during the first operational condition, the power electronics loop is used to heat a battery in the battery loop while bypassing the radiator loop.

In a further non-limiting embodiment of any of the foregoing systems, wherein, when in the first operational condition, the heater loop includes a PTC heater and a heater core, and wherein the first valve isolates the heater loop from all other loops such that the PTC heater and the heater core are directly looped together, and wherein when in the first operational condition, the first valve and the second valve cooperate with each other such that there is no flow through a radiator in the radiator loop and no flow through a battery chiller in the battery loop.

In a further non-limiting embodiment of any of the foregoing systems, each of the first valve and the second valve includes a first section, a second section, a third section, and a fourth section, and wherein each of the first section, the second section, the third section, and the fourth section include an outlet port A, an inlet port B, an outlet port C, an outlet port D, and an inlet port E, and wherein when in the first operational condition:
  an outlet from a battery heat exchanger in the battery loop connects to inlet port E in the third section of the first valve,
  flow to the battery chiller blocked via outlet port D in the third section of the first valve such that there is no flow through the chiller,
  inlet port E in the third section connects to outlet port A in the third section of the first valve 60 such that flow can bypass the battery chiller,
  outlet port A in the third section of the first valve feeds into inlet port E of the first section of the second valve which fluidly connects to the outlet port D of the first section of the second valve,
  the outlet port D of the first section of the second valve connects to the power electronics loop,
  flow is blocked at outlet port A in the first section of the second valve such that all flow through the first section of the second valve bypasses the radiator,
  flow exiting power electronics in the power electronics loop feeds into the inlet port B of the first section of the second valve which connects to outlet port C of the first section 130 of the second valve 160, and outlet port C of the first section 130 of the second valve 160 feeds back into the battery loop to heat the battery.

In a further non-limiting embodiment of any of the foregoing systems, when in a second operational condition, flow exiting the battery loop can have a portion directed into a radiator in the radiator loop and can have another portion directed to bypass the radiator, and wherein flow bypassing and exiting the radiator is then directed into the power electronics loop before being directed back into the battery loop.

In a further non-limiting embodiment of any of the foregoing systems, when in the second operational condition:
  the heater loop includes a PTC heater and a heater core, and wherein the first valve isolates the heater loop from all other loops such that the PTC heater and the heater core are directly looped together, and
  the first valve and the second valve cooperate with each other such that there is no flow through a battery chiller in the battery loop.

In a further non-limiting embodiment of any of the foregoing systems, when in a third operational condition:
  flow exiting the battery loop is sent directly into the radiator in the radiator loop,
  flow exiting the radiator is then sent directly into the power electronics loop, and
  flow exiting the power electronics loop is then fed back into the battery loop.

In a further non-limiting embodiment of any of the foregoing systems, when in the third operational condition:
  the heater loop includes a PTC heater and a heater core, and wherein the first valve isolates the heater loop from all other loops such that the PTC heater and the heater core are directly looped together, and
  the first valve and the second valve cooperate with each other such that there is no flow through a battery chiller in the battery loop.

In a further non-limiting embodiment of any of the foregoing systems, when in a fourth operational condition:

flow exiting the battery loop is directed into a PTC heater in the heater loop by the first valve, flow exiting the PTC heater is directed into a heater core in the heater loop, flow exiting the heater core flows into the second valve and bypasses a radiator in the radiator loop and is directed into the power electronics loop, and flow exiting the power electronics loop is directed by the second valve into the battery loop.

In a further non-limiting embodiment of any of the foregoing systems, when in the fourth operational condition:

the first valve and the second valve cooperate with each other such that there is no flow through a battery chiller in the battery loop and no flow through the radiator in the radiator loop.

In a further non-limiting embodiment of any of the foregoing systems, when in a fifth operational condition:

flow exiting the battery loop is directed into the PTC heater in the heater loop by the first valve, flow exiting the PTC heater is directed into the heater core in the heater loop, flow exiting the heater core is directed into the second valve via the first valve, with the second valve subsequently directing flow into the radiator in the radiator loop, flow exiting the radiator is directed into the power electronics loop, and flow exiting the power electronics loop is directed by the second valve into the battery loop.

In a further non-limiting embodiment of any of the foregoing systems, when in the fifth operational condition:

the first valve and the second valve cooperate with each other such that there is no flow through a battery chiller in the battery loop.

In a further non-limiting embodiment of any of the foregoing systems, when in a sixth operational condition:

flow exiting a battery heat exchanger in the battery loop is directed into a battery chiller in the battery loop with the first valve, flow exiting the battery chiller flows into the second valve and is directed into the radiator in the radiator loop, flow exiting the radiator is directed into the power electronics loop, flow exiting the power electronics loop is directed by the second valve back into the battery loop, and the first valve isolates the heater loop from all other loops such that the PTC heater and the heater core are directly looped together.

In a further non-limiting embodiment of any of the foregoing systems, the first valve and the second valve are the only valves within the thermal management system.

In a further non-limiting embodiment of any of the foregoing systems, the system includes a refrigerant system that is used to cool the cabin, wherein the refrigerant system includes a chiller and a refrigerant heat exchanger, and wherein the refrigerant heat exchanger fluidly communicates with ambient atmosphere for cooling/heating and the chiller fluidly communicates with the glycol system for cooling/heating.

In a further non-limiting embodiment of any of the foregoing systems, the system includes a heat pump to provide heating from the refrigerant system to the glycol system.

In a further non-limiting embodiment of any of the foregoing systems, the second valve is fluidly connected to the first valve to provide battery heating within the battery loop while a vehicle is off charge, and while also being able to independently heat a cabin.

A method according to another exemplary aspect of the present disclosure includes, among other things, fluidly connect one or more of a radiator loop, a power electronics loop, a heater loop, and a battery loop together; and fluidly connecting a second valve to the first to provide at least one operational condition where waste heat from power electronics in the power electronics loop is used to heat a battery in the battery loop independently or additively through a PTC heater to heat a cabin area.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 1A schematically illustrates a powertrain of an electrified vehicle.

FIG. 1B schematically illustrates a control system for a thermal management system for an electrified vehicle.

DETAILED DESCRIPTION

Figure 2A:
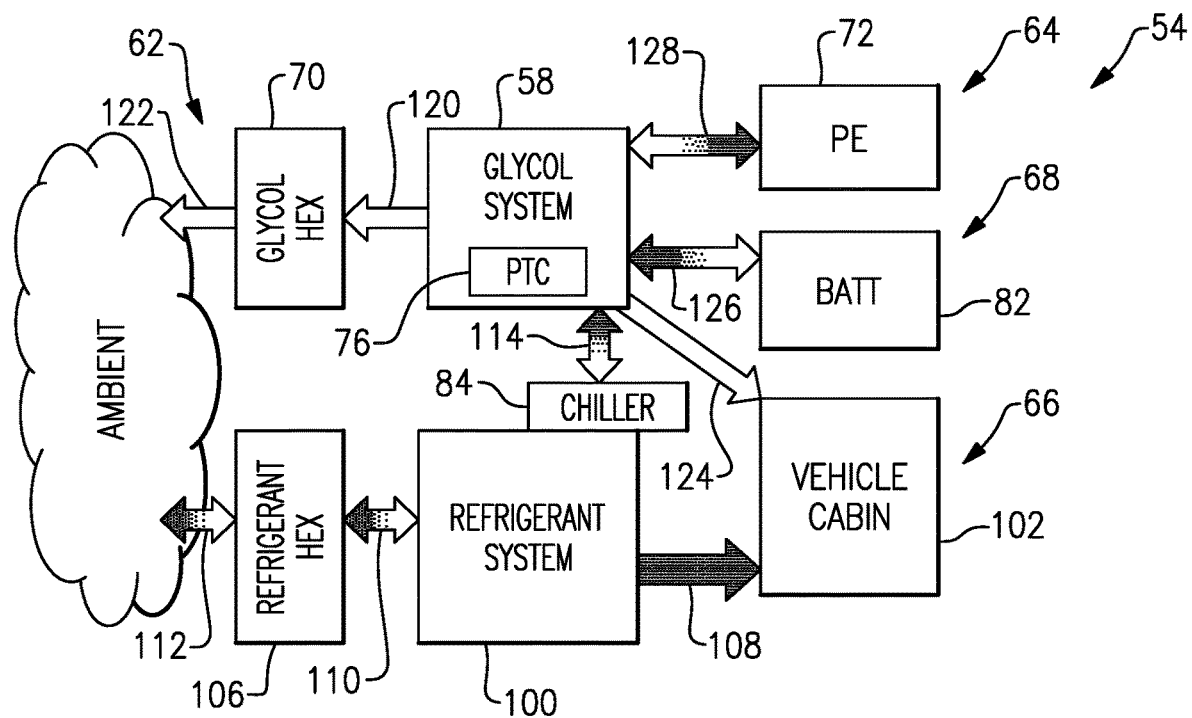
FIG. 2A illustrates a thermal management system for an electrified vehicle.

This disclosure details a thermal management system for electrified vehicles. An exemplary thermal management system may utilize one or more valves to connect one or more of radiator, power electronics, heater, and battery loops together and may also be configured to isolate at least one of the radiator, power electronics, heater, and battery loops from any remaining loops of the radiator, power electronics, heater, and battery loops.

FIG. 1A schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1A, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells 56) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12. In one example, the battery comprises lithium ferrophosphate (LFP) batteries. These batteries can require maintenance heating while they are off-charge/off-plug.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

During certain conditions, such as battery cell charging event, battery cell discharging events, hot ambient conditions, etc., a relatively significant amount of heat can be generated by the battery cells 56 of the battery pack 24. Other components of the electrified vehicle can also produce heat and/or require cooling dependent upon various vehicle operating conditions. It is desirable to manage this heating and cooling to increase the capacity and life of the battery cells 56 and therefore increase the efficiency of the battery pack 24, and well as reducing energy usage. Systems and techniques for actively and efficiently managing this heat are therefore detailed below.

Figure 2B:
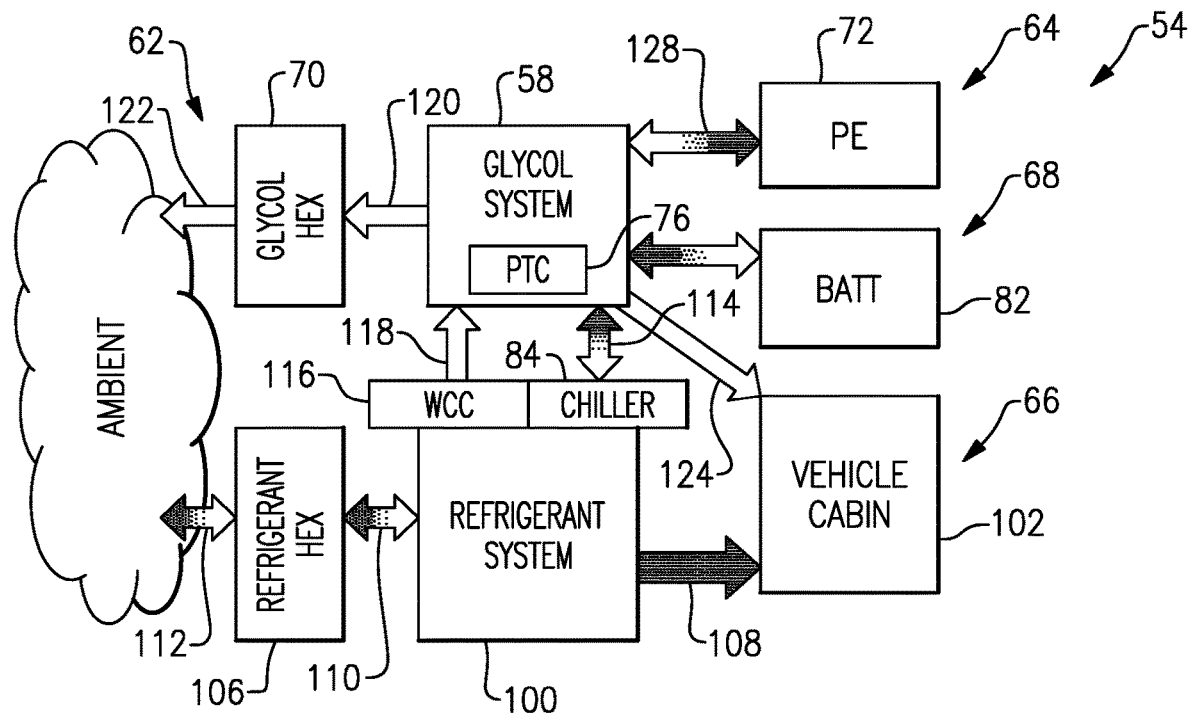
FIG. 2B illustrates a thermal management system similar to FIG. 2A but which includes a heat pump.

FIGS. 2A-B schematically illustrate a thermal management system 54 with four circuit loops that can be incorporated into an electrified vehicle, such as the electrified vehicle 12 of FIG. 1A. The thermal management system 54 may be controlled to manage the thermal load generated by various vehicle components, such as the battery pack 24 of the electrified vehicle 12, for example, as well as other components. Optionally, a primary engine cooling path for the engine 14 may also be added to the four exemplary circuit loops shown in FIG. 2.

Figure 3A:
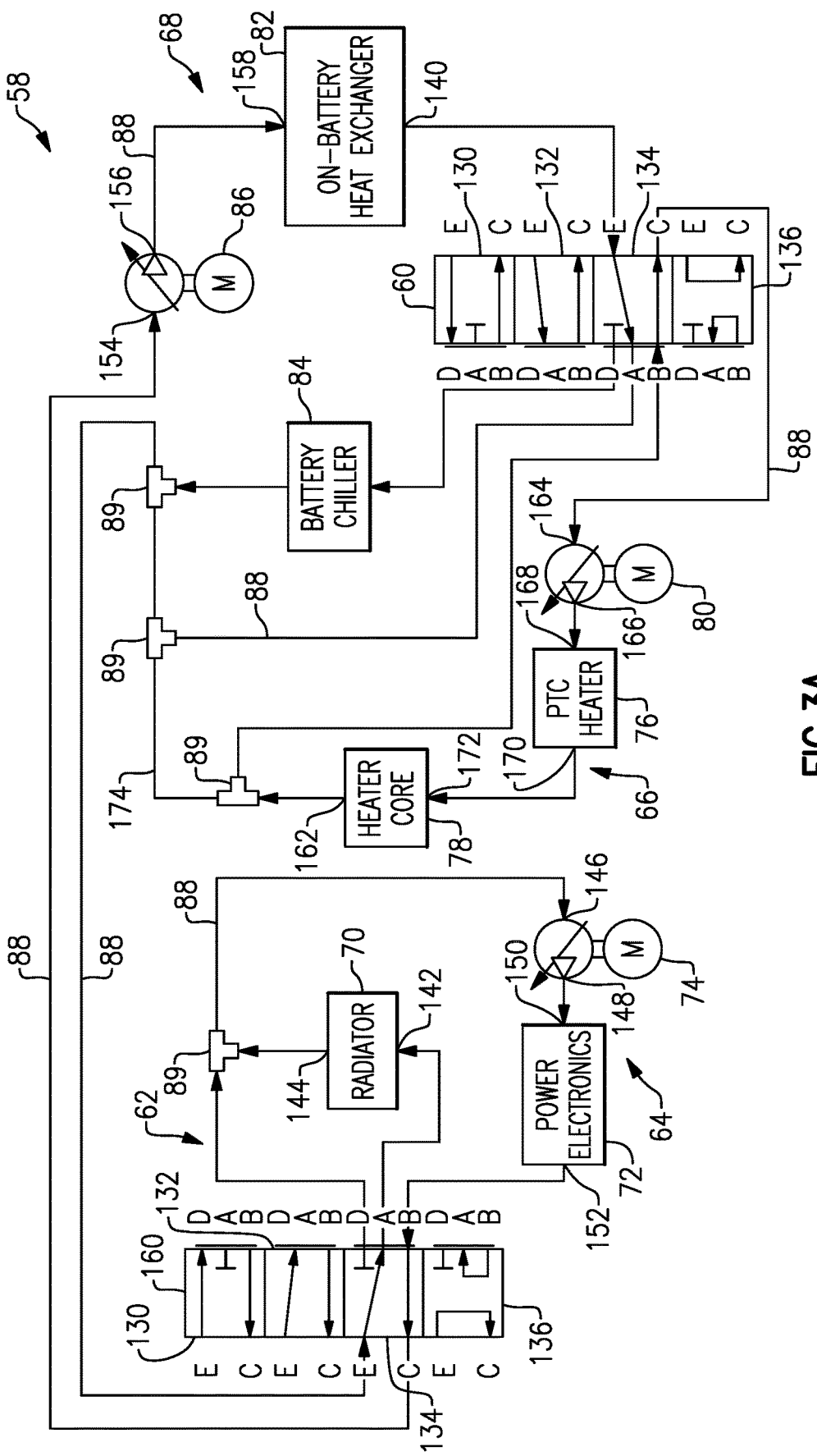
FIG. 3A is a schematic diagram of one operational condition.

In one example shown in FIG. 2A, the thermal management system includes a radiator loop 62, a power electronics (PE) loop 64, a heater loop 66 (optionally including a primary engine circuit), and a battery loop 68. Each of these loops 62, 64, 66, 68 operates within a glycol system 58. In one example, the radiator loop 62 comprises a low temperature radiator loop that includes a glycol HEX, such as a radiator 70 for example, that serves to release heat to the external atmosphere. In one example, the power electronics loop 64 includes power electronics 72, such as the electric machines that drive the wheels for example, and at least one variable speed motor driven pump 74 (FIG. 3A). In one example, the heater loop 66 comprises a passenger cabin/heater loop that includes a Positive Temperature Coefficient (PTC) heater 76, a heater core 78, and at least one variable speed motor driven pump 80 (FIG. 3A). In one example, PTC heaters are liquid PTC heaters. In one example, the battery loop 68 comprises a battery/chiller loop and includes an on-battery heat exchanger 82, a battery chiller 84, and at least one variable speed motor driven pump (FIG. 3A).

Each loop can be viewed as a heat generator or a heat dissipater and each loop has different minimum and maximum operating temperatures. For example, the low temperature radiator (LTR) loop 62 comprises a heat dissipater, the power electronics (PE) loop 64 comprises a heat generator having a maximum temperature of 70 degrees Celsius for example, the cabin/battery heater (HTR) loop comprises a heat generator and heat dissipater that operate within a range of −40 degrees Celsius to 110 degrees Celsius for example, and the chiller/battery loop 68 comprises a heat generator and heat dissipater that operate within a range of 10 degrees Celsius to 50 degrees Celsius, for example. These extreme temperature ranges of the components need thermal management to maintain the required temperatures through heat transfer between components.

As shown in FIG. 2A, a refrigerant system 100 cooperates with the glycol system 58 to provide further thermal management for a passenger cabin 102 that is within the passenger cabin/heater loop 66. The refrigerant system 100 includes the chiller 84 and a refrigerant HEX 106. The refrigerant system 100 is used to cool the passenger cabin 102 as indicated at 108. The refrigerant system 100 fluidly communicates with the refrigerant HEX 106 for cooling/heating as indicated at 110. The refrigerant HEX 106 fluidly communicates with the ambient atmosphere for cooling/heating as indicated at 112. The chiller 84 fluidly communicates with the glycol system 58 for cooling/heating as indicated at 114. FIG. 2B shows an example where a heat pump 116 is added to provide heating from the refrigerant system 100 to the glycol system 58 as indicated at 118. FIG. 2A is a configuration without the heat pump 116.

The glycol system 58 exhausts heat to the radiator 70, as indicated at 120, which then exhausts heat to the ambient atmosphere as indicated at 122. The glycol system 58 provides heat to the passenger cabin 102 as indicated at 124. The glycol system 58 fluidly communicates with the on-battery heat exchanger 82 for cooling/heating as indicated at 126. The glycol system 58 fluidly communicates with the power electronics 72 for cooling/heating as indicated at 128. Thus, the subject disclosure provides for adding heat from the power electronics 72 to the battery function and also allows the battery to be cooled via the glycol HEX.

As discussed above, the thermal management system 54 includes a glycol based system 58 that operates within the four loops 62, 64, 66, 68. The glycol system 58 selectively communicates a glycol based coolant, e.g. water mixed with ethylene glycol, through the various loops to thermally manage the temperature of the various components within the loops 62, 64, 66, 68. The coolant may be circulated through various conduits 88 and T-connections 89 to control the temperature of the different components within the loops 62, 64, 66, 68.

In one example, the glycol system 58 includes a first valve 60 and a second valve 160 (FIG. 3A) that interact with the four loops 62, 64, 66, 68 to provide a desired heating/cooling configuration. In one example, the first valve 60 and the second valve 160 are identical to each other. Each of the valves 60, 160 includes four different modes to provide a total of sixteen different usable modes when combined with each other.

Figure 3B:
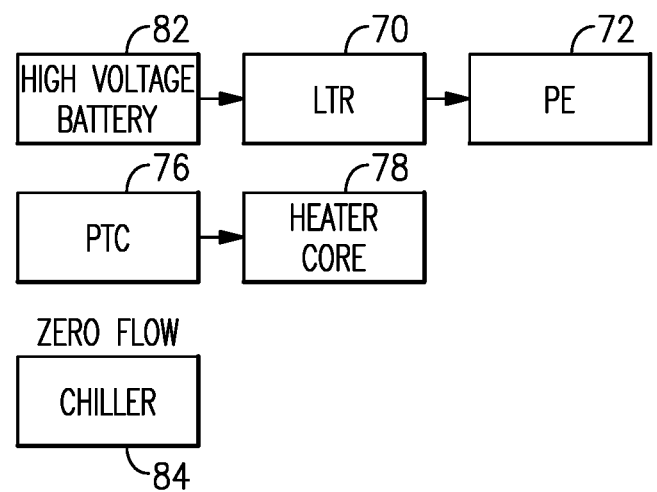
FIG. 3B is a block diagram showing what flows are connected to what subsystems for the operation condition shown in FIG. 3A.

Each valve has first section 130, a second section 132, a third section 134, and a fourth section 136. Each of the sections 130, 132, 134, 136 have ports A, B, C, D, E. FIGS. 3A-18B will show each of the sixteen different modes. In one example, the modes are identified numerically by the section of the valve that is being used. For example, FIGS. 3A-3B show mode 3.3 where the first number is the primary valve mode, i.e. third section 134 for first valve 60, and the second number is the secondary valve mode, i.e. third section 134 for second valve 160. The block diagram of FIG. 3B shows what flows are connected to what subsystems with the valve mode 3.3 as shown in FIG. 3A.

The valves 60, 160 are controlled by a system controller 90 (FIG. 1B) to control flow through the ports A, B, C, D, E within the valve sections 130, 132, 134, 136 amongst the various loops 62, 64, 66, 68. The controller 90 receives data from various sensors 92, which can include temperature sensors, speed sensors, flow sensors, etc. for example. The system controller 90 analyzes the sensor data and controls the valves 60, 160 in response to various vehicle operational conditions as will be explained below.

FIGS. 3A-3B disclose mode 3.3 where the battery can be cooled using the radiator. In this mode, an outlet 140 from the battery heat exchanger 82 in the battery loop 68 connects to inlet port E in the third section 134 of the first valve 60. Flow to the battery chiller 84 is blocked via outlet port D in the third section 134 such that there is no flow through the chiller 84. The inlet port E in the third section connects to outlet port A in the third section 134 of the first valve 60, which then feeds into inlet port E of the third section 134 of the second valve 160. The inlet port E of the third section 134 of the second valve 160 connects to the outlet port A of the third section 134, which then feeds into an inlet 142 to the radiator 70. Flow is blocked at outlet port D in the third section 134 such that flow cannot bypass the radiator 70. An outlet 144 of the radiator 70 connects to the PE loop 64 and feeds into an inlet 146 to the variable speed motor driven pump 74. An outlet 148 from the pump 74 feeds into an inlet 150 to the PE 72, and an outlet 152 from the PE 72 feeds into an inlet port B in the third section 134 of the second valve 160. The inlet port B then connects to the outlet port C in the third section 134 of the second valve 160. This outlet port C then connects back into the battery loop 68 and feeds into an inlet to the variable speed motor driven pump 86, and an outlet 156 from the pump 86 then feeds into an inlet 158 to the battery heat exchanger 82.

Within the heater loop 66, the first valve 60 isolates the loop 66 such that the PTC heater 76 and heater core 78 are directly looped together. In one example, the heater loop 66 can also include the water cooled condenser in the case of a vehicle having a heat pump 116. An outlet 162 of the heater core 78 feeds into the inlet port B of the third section 134 of the first valve 60. In one example, there is a pressure balancing hose 174 between the battery loop 68 and heater loop 66. The pressure balancing hose 174 is not intended to have flow under operation based on a pressure differential between the battery loop 68 and heater loop 66; however, under certain conditions there may be some extremely small amount of flow. As such, due to the pressure differential, flow exiting the heater core 78 is directed back into the first valve 60. The inlet port B of the third section 134 of the first valve 60 connects to the outlet port C of the third section 134 of the first valve 60. The outlet port C feeds into an inlet 164 to the variable speed motor driven pump 80, and an outlet 166 of the pump 80 feeds into an inlet 168 to the PTC heater 76. An outlet 170 of the PTC heater 76 then directly connects to an inlet 172 of the heater core 78.

FIG. 3B shows the flow connections to the subsystems with the valve mode 3.3 as shown in FIG. 3A. In mode 3.3, the battery 82 feeds into the radiator 70 to reject battery heat, and then feeds into the PE 72 and then returns to the battery 82. The PTC heater 76 feeds into the heater core 78 and is then returned to the PTC heater 76 in an isolated loop. There is zero flow through the chiller 84.

Figure 4A:
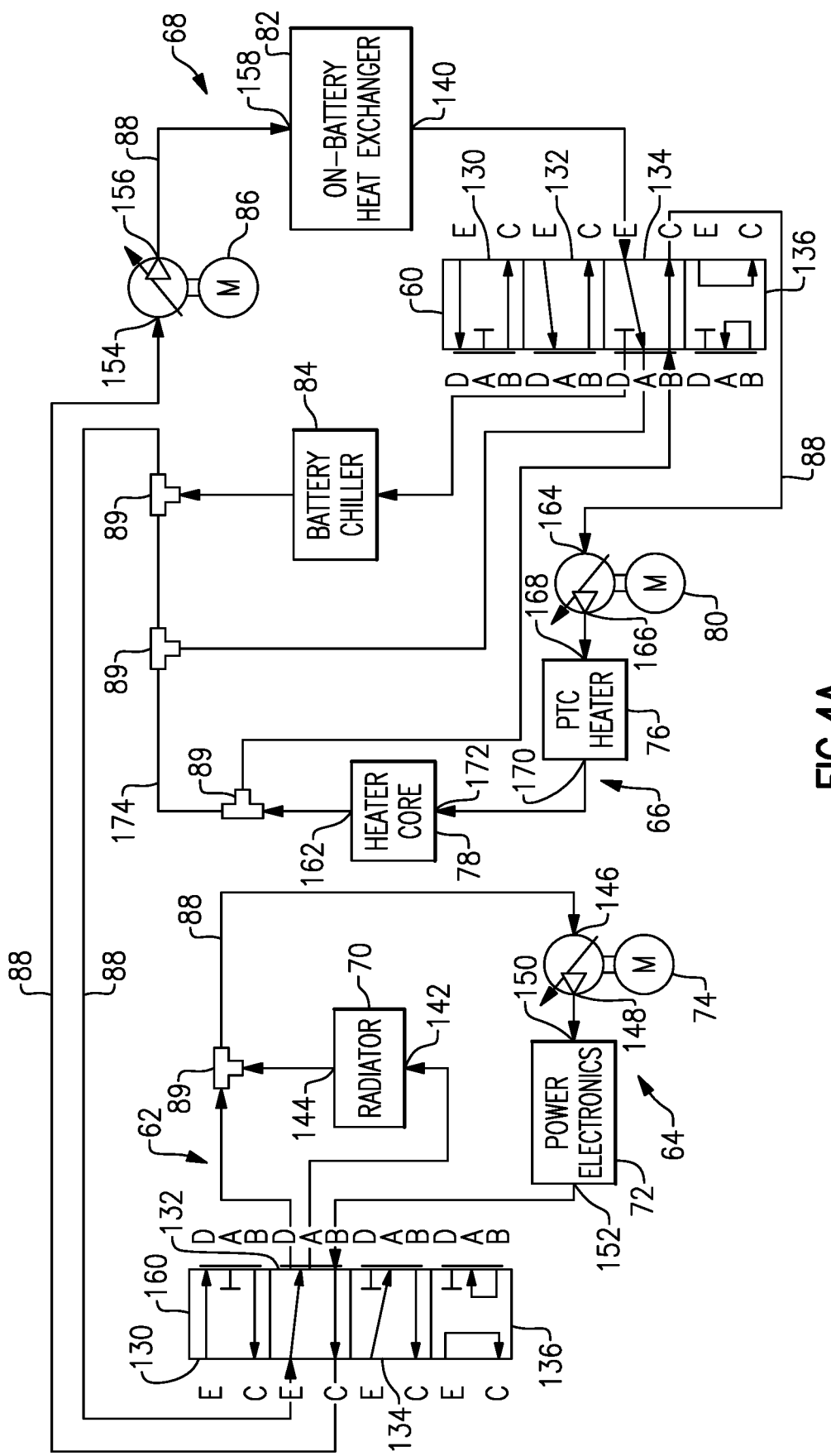
FIG. 4A is a schematic diagram of another operational condition.
Figure 4B:
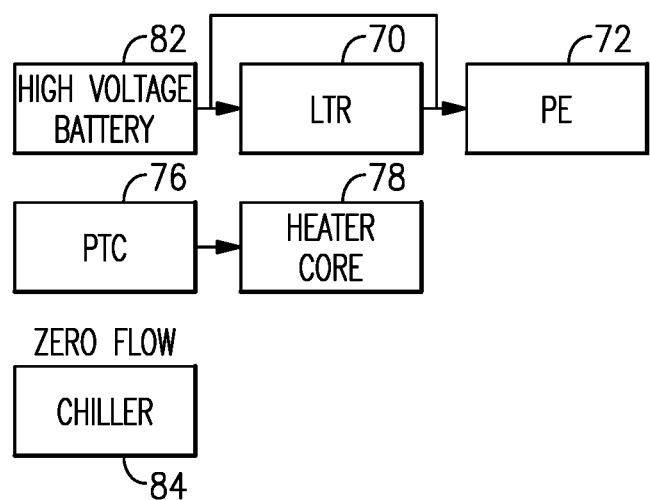
FIG. 4B is a block diagram showing what flows are connected to what subsystems for the operation condition shown in FIG. 4A.

FIGS. 4A-4B disclose mode 3.2, which provides a split configuration for the radiator loop 62. In this mode, within the heater loop 66, the first valve 60 isolates the loop 66 such that the PTC heater 76 and heater core 78 are directly looped together in the same way as described in mode 3.3 in FIG. 3A. In the battery loop 68, an outlet 140 from the battery heat exchanger 82 connects to inlet port E in the third section 134 of the first valve 60. Flow to the battery chiller 84 blocked via outlet port D in the third section 134 such that there is no flow through the chiller 84. The inlet port E in the third section 134 connects to outlet port A in the third section 134 of the first valve 60, which then feeds into inlet port E of the second section 132 of the second valve 160. The inlet port E of the second section 132 of the second valve connects to the outlet port A of the second section 132, which then feeds into an inlet 142 to the radiator 70. The inlet port E of the second section 132 of the second valve 160 also connects to the outlet port D of the second section 132, which joins flow exiting the outlet 144 of the radiator 70, with both flows then being fed into the PE loop 64. The joined flow feeds into the inlet 146 to the variable speed motor driven pump 74. An outlet 148 from the pump 74 feeds into an inlet 150 to the PE 72, and an outlet 152 from the PE 72 feeds into an inlet port B in the second section 132 of the second valve 160. The inlet port B then connects to the outlet port C in the second section 132 of the second valve 160. This outlet port C then connects back into the battery loop 68 and feeds into an inlet 154 to the variable speed motor driven pump 86, and an outlet 156 from the pump 86 then feeds into an inlet 158 to the battery heat exchanger 82.

As shown in FIG. 4B, in mode 3.2 there is a split configuration where a portion of the flow from the battery 82 feeds into the radiator 70 to reject battery heat, which then feeds into the PE 72 and then returns to the battery 82. Additionally, a portion of the flow from the battery 82 can bypass the radiator 70 and join flow exiting the radiator 70 to be then directed into the PE 72. The PTC heater feeds into the heater core 78 and is then returned to the PTC heater 76 in an isolated loop. There is zero flow through the chiller 84.

Figure 5A:
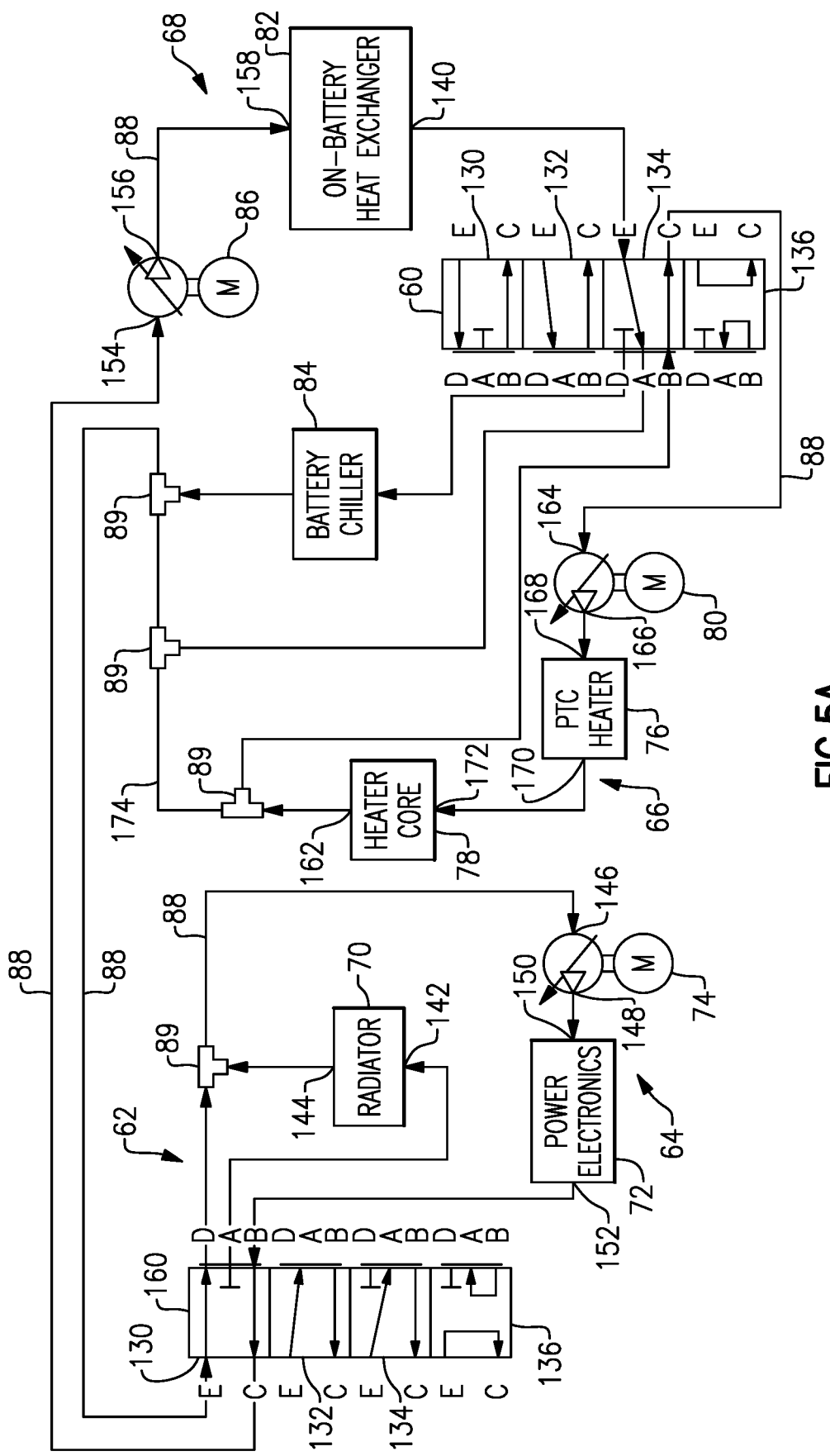
FIG. 5A is a schematic diagram of another operational condition.
Figure 5B:
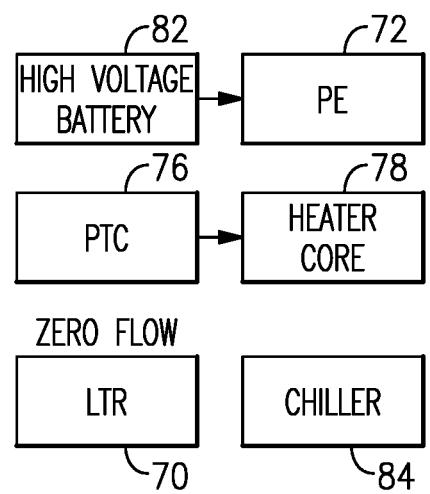
FIG. 5B is a block diagram showing what flows are connected to what subsystems for the operation condition shown in FIG. 5A.

FIGS. 5A-5B disclose mode 3.1, which allows the PE loop 64 to send waste heat to the battery heat exchanger 82 while bypassing the radiator 70. This particular mode state allows the cabin 102 to maintain a higher heater core inlet temperature versus the battery warming temperature, which allows the battery to be warmed while not on-plug. In this mode, within the heater loop 66, the first valve 60 isolates the loop 66 such that the PTC heater 76 and heater core 78 are directly looped together in the same way as described in mode 3.3 in FIG. 3A. In the battery loop 68, an outlet 140 from the battery heat exchanger 82 connects to inlet port E in the third section 134 of the first valve 60. Flow to the battery chiller 84 blocked via outlet port D in the third section 134 such that there is no flow through the chiller 84. The inlet port E in the third section 134 connects to outlet port A in the third section 134 of the first valve 60, which then feeds into inlet port E of the first section 130 of the second valve 160. The inlet port E of the first section 130 fluidly connects to the outlet port D of the first section 130 of the second valve 160, which then connects to the PE loop 64. Flow is blocked at outlet port A in the first section 130 of the second valve 160 such that all flow through the first section 130 bypasses the radiator 70. The outlet port D of the first section 130 of the second valve 160 feeds into the inlet to the variable speed motor driven pump 74. The outlet 148 from the pump 74 feeds into the inlet 150 of the PE 72 and the outlet 152 of the PE 72 feeds into the inlet port B of the first section 130 of the second valve 160. Inlet port B connects to outlet port C of the first section 130 of the second valve 160, which then feeds back into the battery loop 68 by feeding into the inlet 154 to the pump 86. The outlet 156 from the pump 86 then feeds into the inlet 158 to the battery heat exchanger 82.

As shown in FIG. 5B, in mode 3.1 the battery heat exchanger 82 and PE 72 are directly looped together such that heat exiting the PE 72 is directed to warm the battery via the battery heat exchanger 82. The PTC heater 76 feeds into the heater core 78 and is then returned to the PTC heater 76 in an isolated loop. There is zero flow through the chiller 84, and there is zero flow through the radiator 70.

Figure 6A:
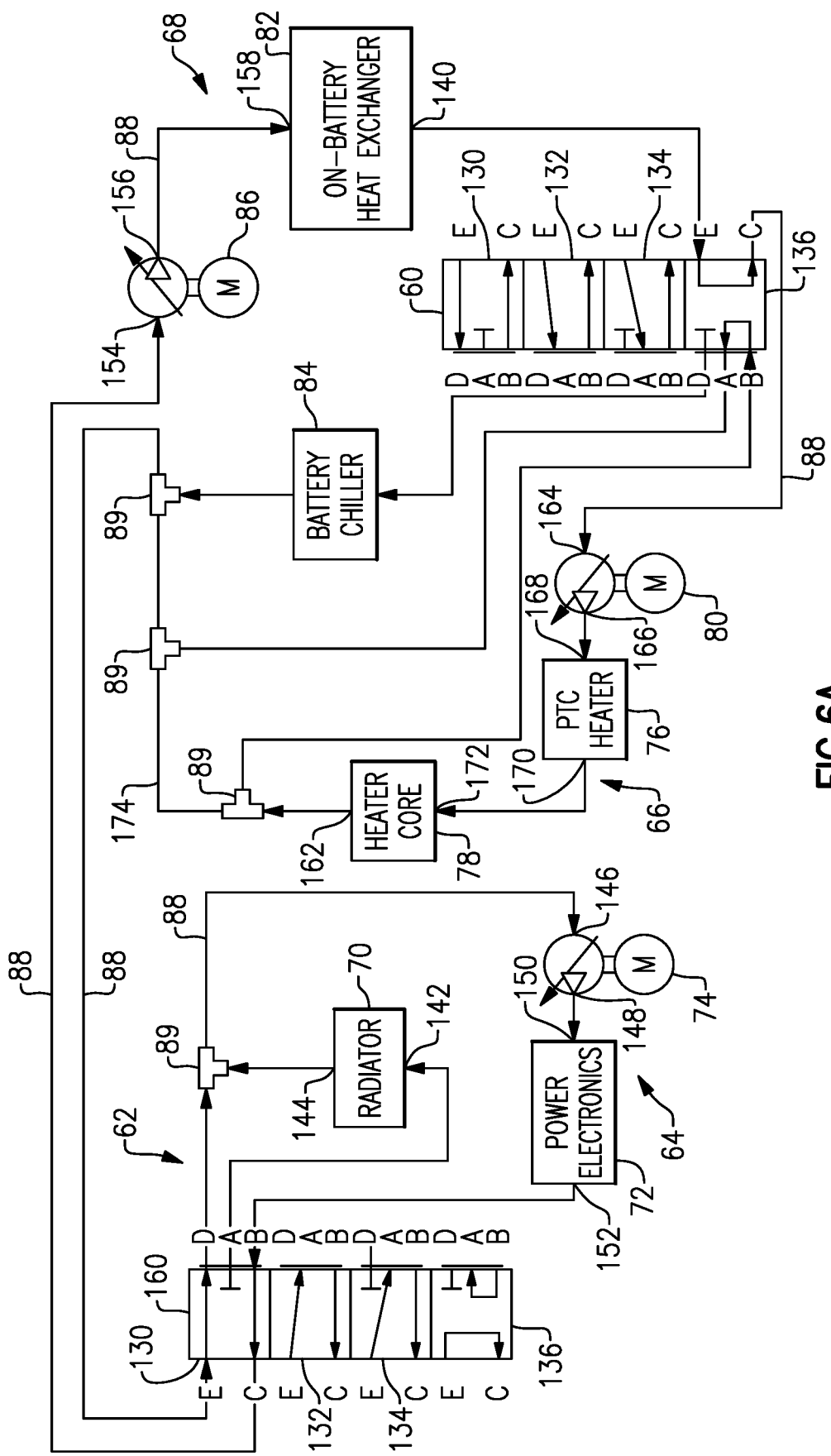
FIG. 6A is a schematic diagram of another operational condition.
Figure 6B:
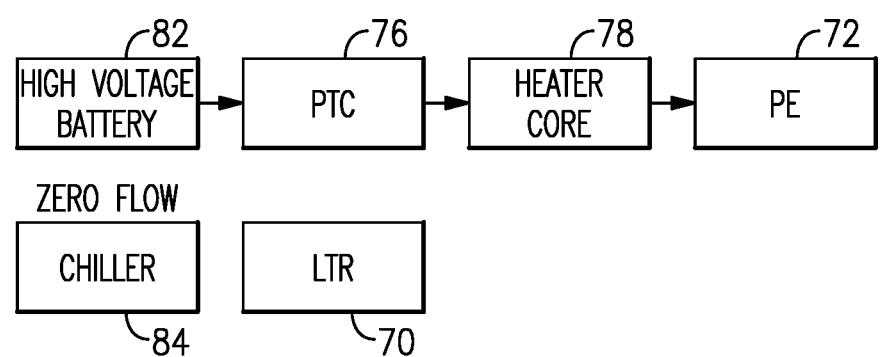
FIG. 6B is a block diagram showing what flows are connected to what subsystems for the operation condition shown in FIG. 6A.

FIGS. 6A-6B disclose mode 4.1, which connects the battery heat exchanger 82, PTC 76, heater core 78, and PE 72. The outlet 140 from the battery heat exchanger 82 feeds into inlet port E of the fourth section 136 of the first valve 60, which connects to outlet port C of the fourth section 136 of the first valve 60. Flow to the battery chiller 84 blocked via outlet port D in the fourth section 136 such that there is no flow through the chiller 84. The outlet port C of the fourth section 136 of the first valve 60 feeds into the inlet 164 of the pump 80, and the outlet 166 of the pump 80 feeds into the inlet 168 to the PTC heater 76. The outlet 170 from the PTC heater 76 feeds into the inlet 172 to the heater core 78, and the outlet 162 of the heater core 78 feeds into inlet port B of the fourth section 136 of the first valve 60. Due to the pressure differential at the pressure balancing hose 174, flow exiting the heater core 78 is directed back into the first valve 60. The inlet port B connects to outlet port A of the fourth section 136 of the first valve 60, which then connects to inlet port E of the first section 130 of the second valve 160. The inlet port E connects to outlet port D in the first section 130 of the second valve 160, which feeds into the PE loop 64. Flow is blocked at outlet port A of the first section 130 of the second valve 160 such that all flow bypasses the radiator 70 and enters the PE loop 64. The outlet port D of the first section 130 of the second valve 160 feeds into the inlet 146 to the pump 74, and the outlet 148 of the pump 74 feeds into the inlet 150 to the PE 72. The outlet of the PE 72 feeds into inlet port B of the first section 130 of the second valve 160, which then connects to outlet port C of the first section 130 of the second valve 160. The outlet port C then connects back into the battery loop 68 by feeding into the inlet 154 to the pump 86. The outlet 156 of the pump 86 feeds into the inlet 158 to the battery heat exchanger 82.

As shown in FIG. 6B, in mode 4.1 the battery heat exchanger 82 feeds into the PTC heater 76, then through the heater core 78, and then into the PE 72, such that heat exiting the PE 72 is directed back into the battery loop 68 to warm the battery via the battery heat exchanger 82. There is zero flow through the chiller 84, and there is zero flow through the radiator 70.

Figure 7A:
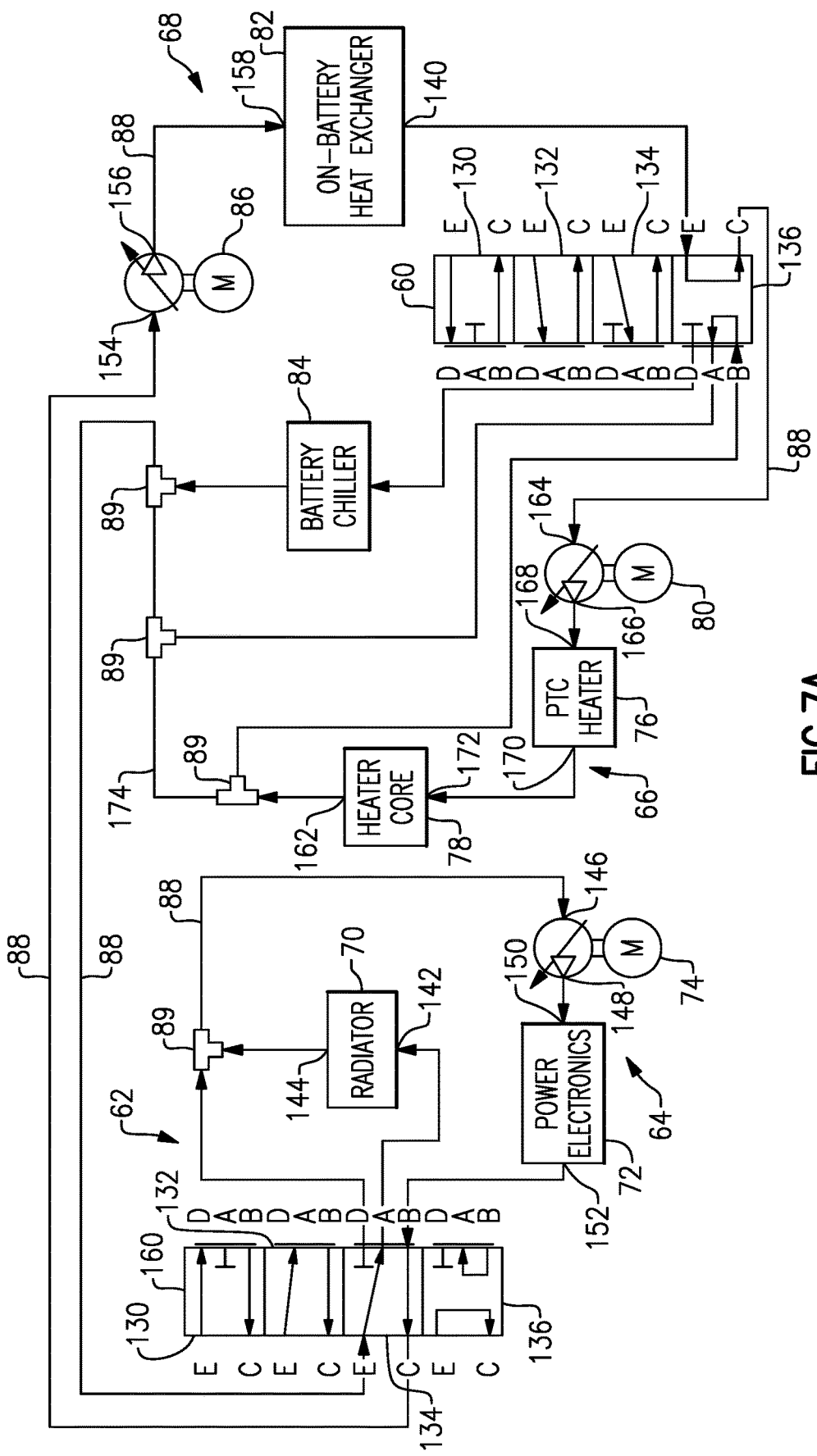
FIG. 7A is a schematic diagram of another operational condition.
Figure 7B:
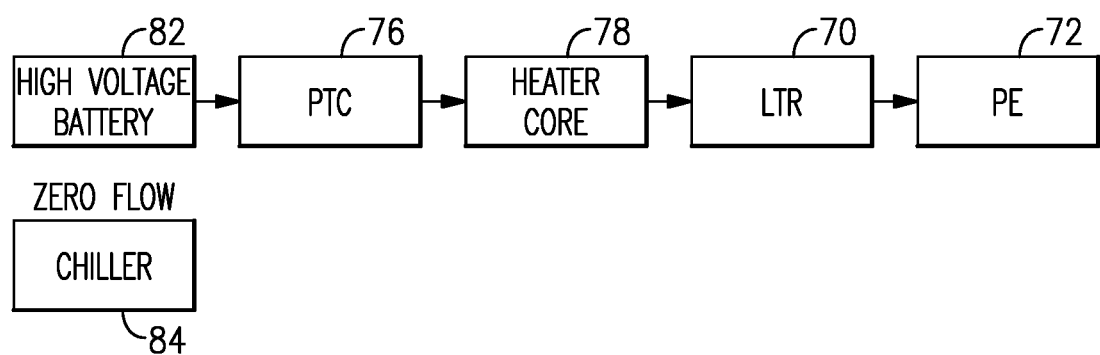
FIG. 7B is a block diagram showing what flows are connected to what subsystems for the operation condition shown in FIG. 7A.

FIGS. 7A-7B disclose mode 4.3, which is similar to mode 4.1, but additionally connects the radiator 70 into the flow path with the battery heat exchanger 82, PTC 76, heater core 78, and PE 72. The outlet 140 from the battery heat exchanger 82 feeds into inlet port E of the fourth section 136 of the first valve 60, which connects to outlet port C of the fourth section 136 of the first valve 60. Flow to the battery chiller 84 is blocked via outlet port D in the fourth section 136 such that there is no flow through the chiller 84. The outlet port C of the fourth section 136 of the first valve 60 feeds into the inlet 164 of the pump 80, and the outlet 166 of the pump 80 feeds into the inlet 168 to the PTC heater 76. The outlet 170 from the PTC heater 76 feeds into the inlet 172 to the heater core 78, and the outlet 162 of the heater core 78 feeds into inlet port B of the fourth section 136 of the first valve 60. Due to the pressure differential at the pressure balancing hose 174, flow exiting the heater core 78 is directed back into the first valve 60. The inlet port B connects to outlet port A of the fourth section 136 of the first valve 60, which then connects to inlet port E of the third section 134 of the second valve 160. The inlet port E connects to outlet port A in the third section 134 of the second valve 160, which feeds into the inlet 142 to the radiator 70. Flow is blocked at outlet port D of the third section 136 of the second valve 160 such that all flow exiting the second valve 160 is directed into the radiator 70. The outlet 144 from the radiator 70 feeds into the inlet 146 to the pump 74, and the outlet 148 of the pump 74 feeds into the inlet 150 to the PE 72. The outlet 152 of the PE 72 feeds into inlet port B of the third section 134 of the second valve 160, which then connects to outlet port C of the third section 134 of the second valve 160. The outlet port C then connects back into the battery loop 68 by feeding into the inlet to the pump 86. The outlet 156 of the pump 86 feeds into the inlet 158 to the battery heat exchanger 82.

As shown in FIG. 7B, in mode 4.3 the battery heat exchanger 82 feeds into the PTC heater 76, then through the heater core 78, then through the radiator 70, and then into the PE 72 before being directed back into the battery loop 68. There is zero flow through the chiller 84.

Figure 8A:
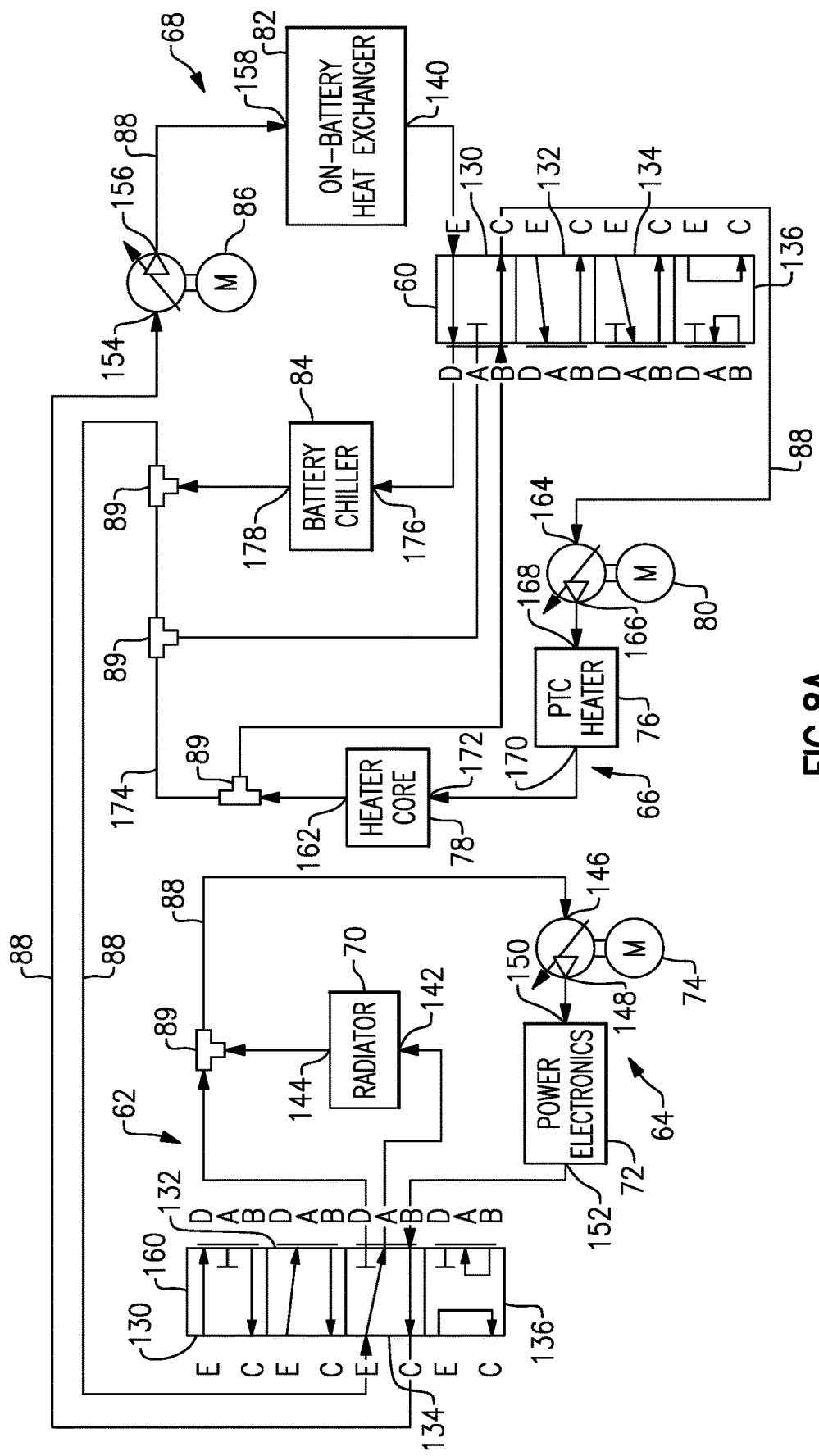
FIG. 8A is a schematic diagram of another operational condition.
Figure 8B:
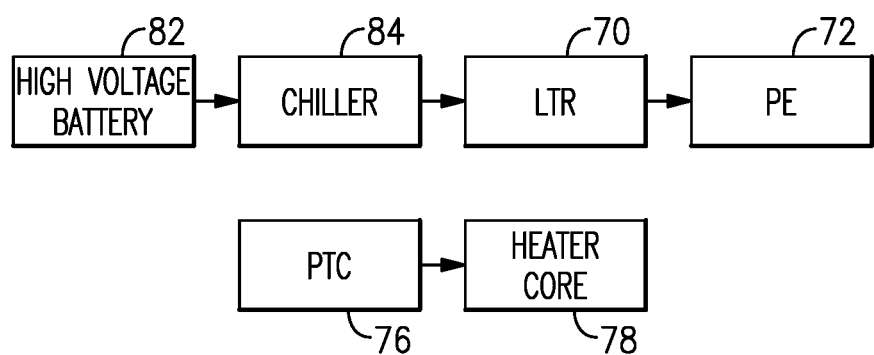
FIG. 8B is a block diagram showing what flows are connected to what subsystems for the operation condition shown in FIG. 8A.

FIGS. 8A-8B disclose mode 1.3, which connects the chiller 84 and radiator 70 to feed into the PE loop 64 before returning to the battery loop 68. The outlet 140 of the battery heat exchanger 82 feeds into inlet port E of the first section of the first valve 60, which then connects to the outlet port D of the first section of the first valve 60. The outlet port D feeds into an inlet 176 to the chiller 84 and the outlet 178 from the chiller 84 is directed to inlet port E of the third section 134 of the second valve 160. Flow through of the first section 130 of the first valve 60 is blocked at outlet port A to that all flow is directed into the chiller 84. The inlet port E of the third section 134 of the second valve 160 is connected to outlet port A of the third section 134 of the second valve 160, which then feeds into the inlet 142 to the radiator 70. Flow is blocked at outlet port D of the third section 134 of the second valve 160 such that all flow exiting the second valve 160 is directed into the radiator 70. The outlet 144 of the radiator 70 feeds into the inlet 146 to the pump 74, and the outlet 148 of the pump 74 feeds into the inlet 150 to the PE 72. The outlet 152 from the PE 72 feeds into inlet port B of the third section 134 of the second valve 160, which connects to outlet port C of the third section 134 of the second valve 160. The outlet port C then feeds into the inlet 154 to the pump 86, and the outlet 156 of the pump 86 fees into the inlet 158 to the battery heat exchanger 82.

In the heater loop 66, the outlet 162 of the heater core 78 connects to the inlet port B of the first section 130 of the first valve 60, which then connects to the outlet port C of the first section 130 of the first valve 60. The outlet port C then feeds into the inlet 164 to pump 80, and the outlet 166 of the pump 80 feeds into the inlet to the PTC heater 76. The outlet 170 of the PTC heater 76 then feeds into the inlet 172 to the heater core 78 such that the PTC heater 76 and heater core 78 are on an isolated loop.

As shown in FIG. 8B, in mode 1.3, flow through the battery heat exchanger 82 feeds into the chiller 84, then into the radiator 70 and then into the PE before being returned to the battery heat exchanger 82. The flow exiting the PTC heater 76 flows directly into the heater core 78 before being returned to the PTC heater 76 in an isolated loop.

Figure 9A:
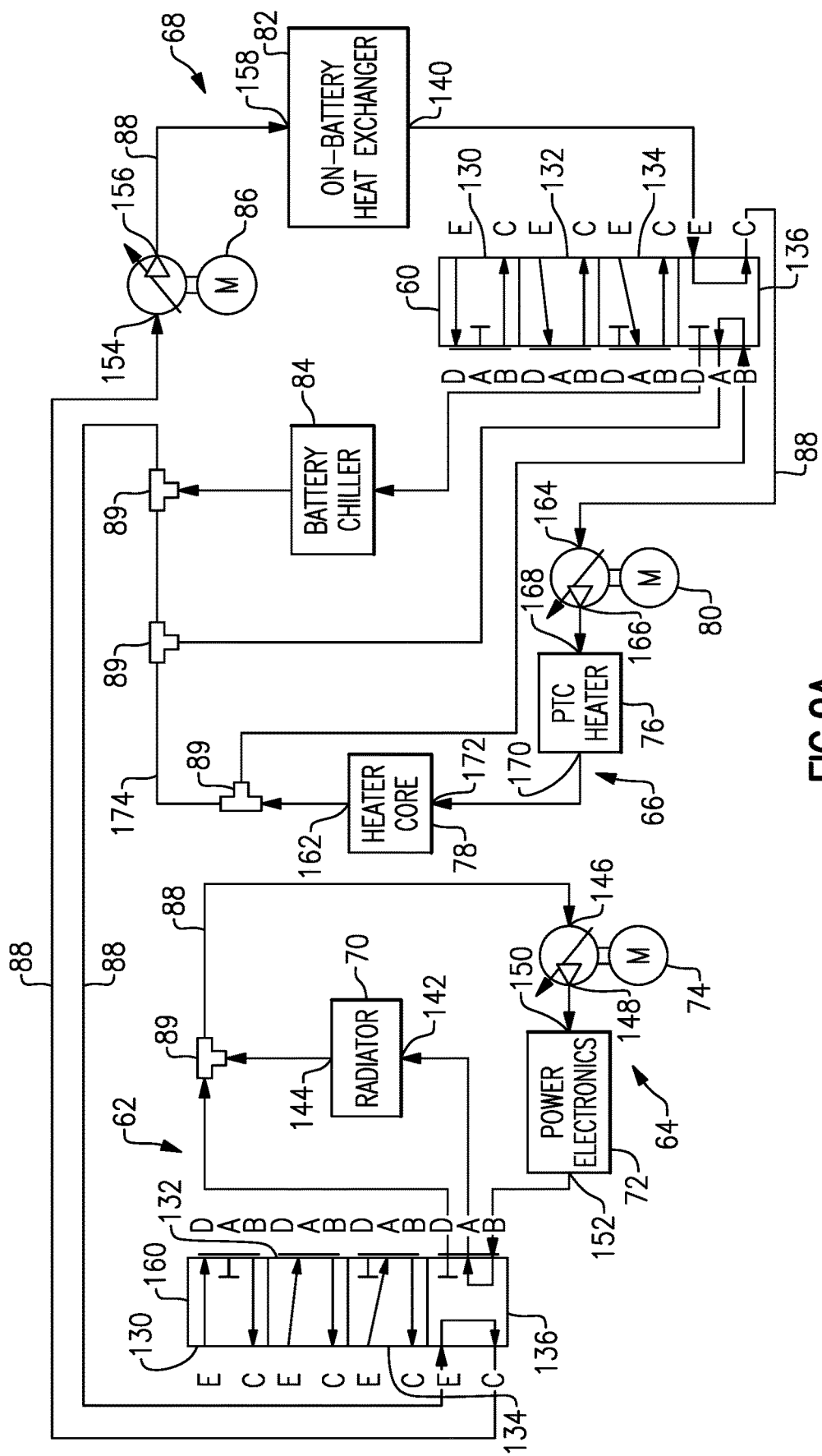
FIG. 9A is a schematic diagram of another operational condition.
Figure 9B:
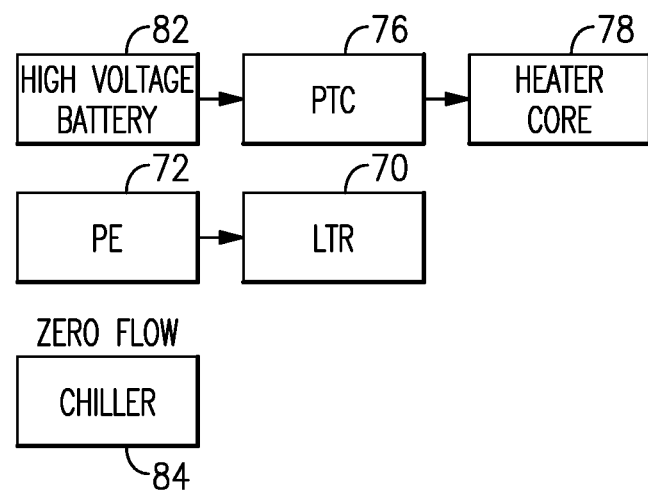
FIG. 9B is a block diagram showing what flows are connected to what subsystems for the operation condition shown in FIG. 9A.

FIGS. 9A-9B disclose mode 4.4, which connects the battery loop 68 and heater loop 66, and which also connects the PE loop 64 to the radiator loop 62. The outlet 140 from the battery heat exchanger 82 feeds into the inlet port E of the fourth section 136 of the first valve 60, which connects to the outlet port C of the first valve 60. Flow is blocked at outlet port A of the fourth section 136 of the first valve such that there is no flow through the chiller 84. The outlet port C feeds into the inlet 164 to the pump 74, and the outlet 166 from the pump 74 feeds into the inlet 168 to the PTC heater 76. The outlet 170 of the PTC heater 76 feeds into the inlet 172 to the heater core 78, and the outlet 162 of the heater core 78 feeds into the inlet port B of the fourth section 136 of the first valve 60. Due to the pressure differential at the pressure balancing hose 174, flow exiting the heater core 78 is directed back into the first valve 60. The inlet port B connects to the outlet port A of the fourth section 136 of the first valve 60, which then bypasses the chiller 84 and feeds into the inlet port E of the fourth section 136 of the second valve 160. The inlet port E connects to outlet port C of the fourth section 136 of the second valve 160, which then feeds into the inlet 154 to the pump 86. The outlet 156 from the pump 86 feeds into the inlet 158 to the battery heat exchanger 82.

In a separate loop configuration, the outlet 152 of the PE 72 connects to the inlet port B of the fourth section 136 of the second valve 160, which connects to the outlet port A of the fourth section 136 of the second valve 160. The outlet port A feeds into the inlet 142 to the radiator 70. The outlet 144 of the radiator 70 feeds into the inlet 146 to the pump 74, and the outlet 148 from the pump 74 feeds into the inlet to the PE 72 to cool the PE 72 in an isolated loop.

As shown in FIG. 9B, in mode 4.4, flow exiting the battery heat exchanger 82 flows through the PTC heater 76 and then through the heater core 78 before returning to the battery heat exchanger 82. Flow exiting the PE 72 flows into the radiator 70 and flow exiting the radiator 70 is directly returned to the PE 72 for cooling purposes.

Figure 10A:
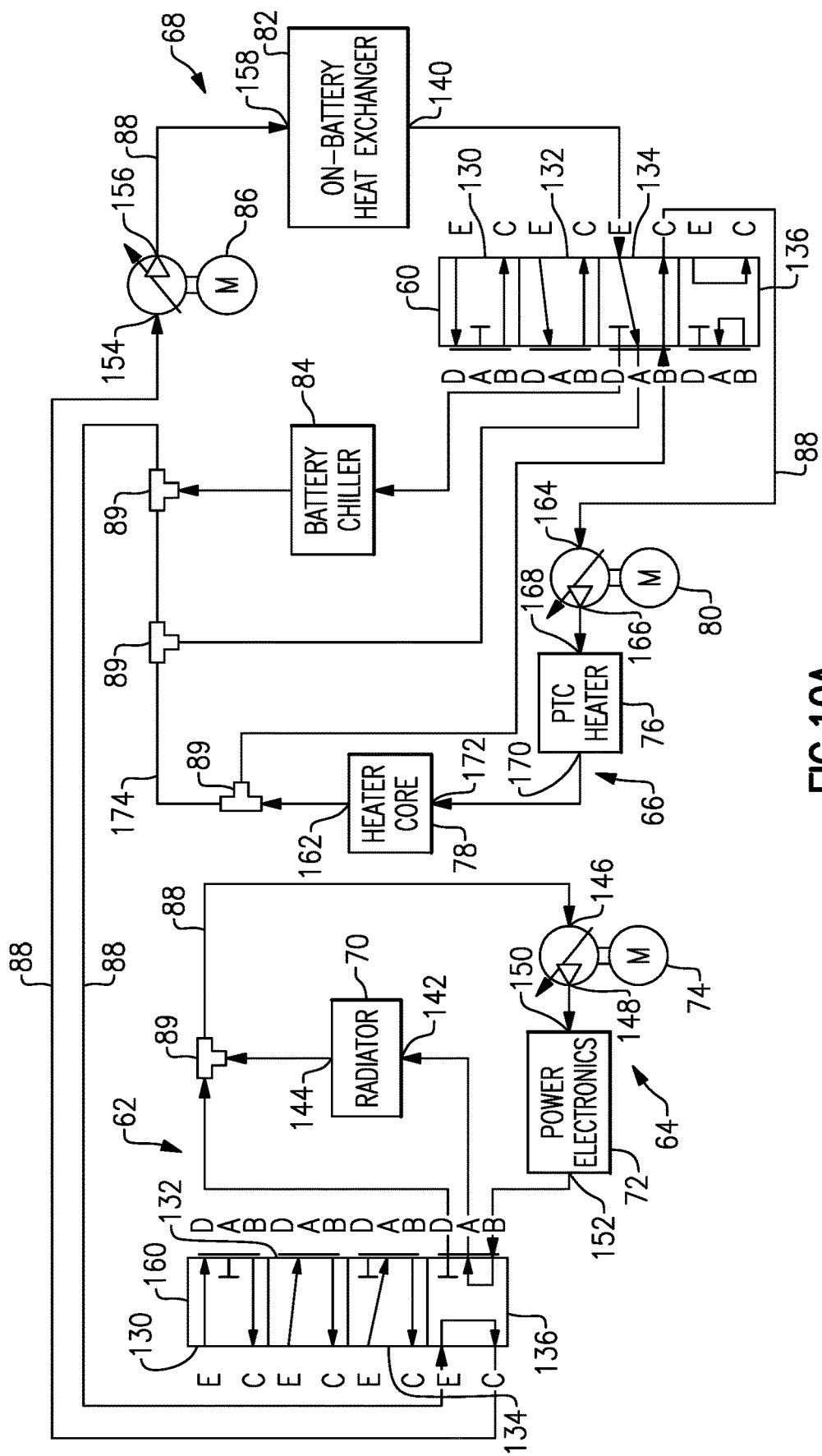
FIG. 10A is a schematic diagram of another operational condition.
Figure 10B:
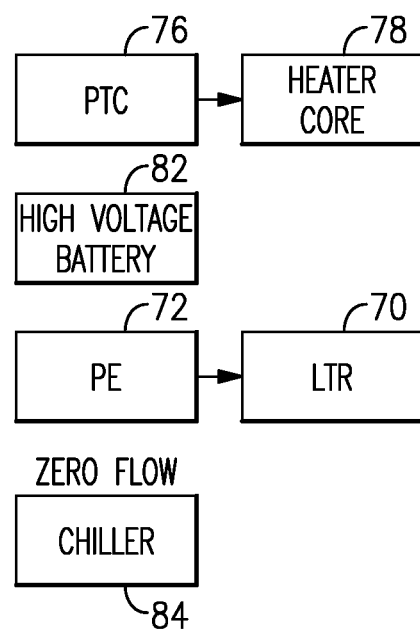
FIG. 10B is a block diagram showing what flows are connected to what subsystems for the operation condition shown in FIG. 10A.

FIGS. 10A-10B disclose mode 3.4, which isolates the battery heat exchanger 82 from all other loops, isolates the PTC heater 76 and heater core 78 in a loop separate from the other loops, and isolates the PE 72 and radiator 70 in a loop separate from all other loops. The outlet 140 from the battery heater exchanger 82 feeds into the inlet port E of the third section 134 of the first valve 60, which connects to the outlet port A of the third section 134 of the first valve 60. Outlet port D of the third section 134 of the first valve 60 is blocked to prevent flow through the chiller 84. Flow exiting the outlet port A of the third section 134 of the first valve 60 bypasses the chiller 84 and connects to the inlet port E of the fourth section 136 of the second valve 160, which connects to outlet port C of the fourth section 136 of the second valve 160. The outlet port C feeds into the inlet 154 to the pump 86 and the outlet 156 of the pump 86 feeds into the inlet 158 to the battery heat exchanger 82.

Within the heater loop 66, the first valve 60 isolates the loop 66 such that the PTC heater 76 and heater core 78 are directly looped together. In one example, the heater loop 66 can also include the water cooled condenser in the case of a vehicle having a heat pump 116. An outlet 162 of the heater core 78 feeds into the inlet port B of the fourth section 136 of the first valve 60. Due to the pressure differential at the pressure balancing hose 174, flow exiting the heater core 78 is directed back into the first valve 60. The inlet port B of the third section 134 of the first valve 60 connects to the outlet port C of the third section 134 of the first valve 60. The outlet port C feeds into the inlet 164 to the variable speed motor driven pump 80, and the outlet 166 of the pump 80 feeds into the inlet 168 to the PTC heater 76. The outlet 170 of the PTC heater 76 then directly connects to an inlet 172 of the heater core 78.

In another isolated loop configuration, the outlet 152 of the PE 72 connects to the inlet port B of the fourth section 136 of the second valve 160, which connects to the outlet port A of the fourth section 136 of the second valve 160. The outlet port A feeds into the inlet 142 to the radiator 70. The outlet 144 of the radiator feeds into the inlet 146 to the pump 74, and the outlet 148 from the pump 74 feeds into the inlet 150 to the PE 72 to cool the PE 72 in an isolated loop.

As shown in FIG. 10B, in mode 3.4, flow exiting the battery heat exchanger 82 is send directly back to the inlet 158 of the battery heat exchanger 82 in an isolated loop. Flow exiting the PTC heater 76 is directed to the heater core 78 and is then returned into the PTC heater 76 in an isolated loop. Flow exiting the PE 72 is directed to the radiator 70 and is then returned to the PE 72 in an isolated loop.

Figure 11A:
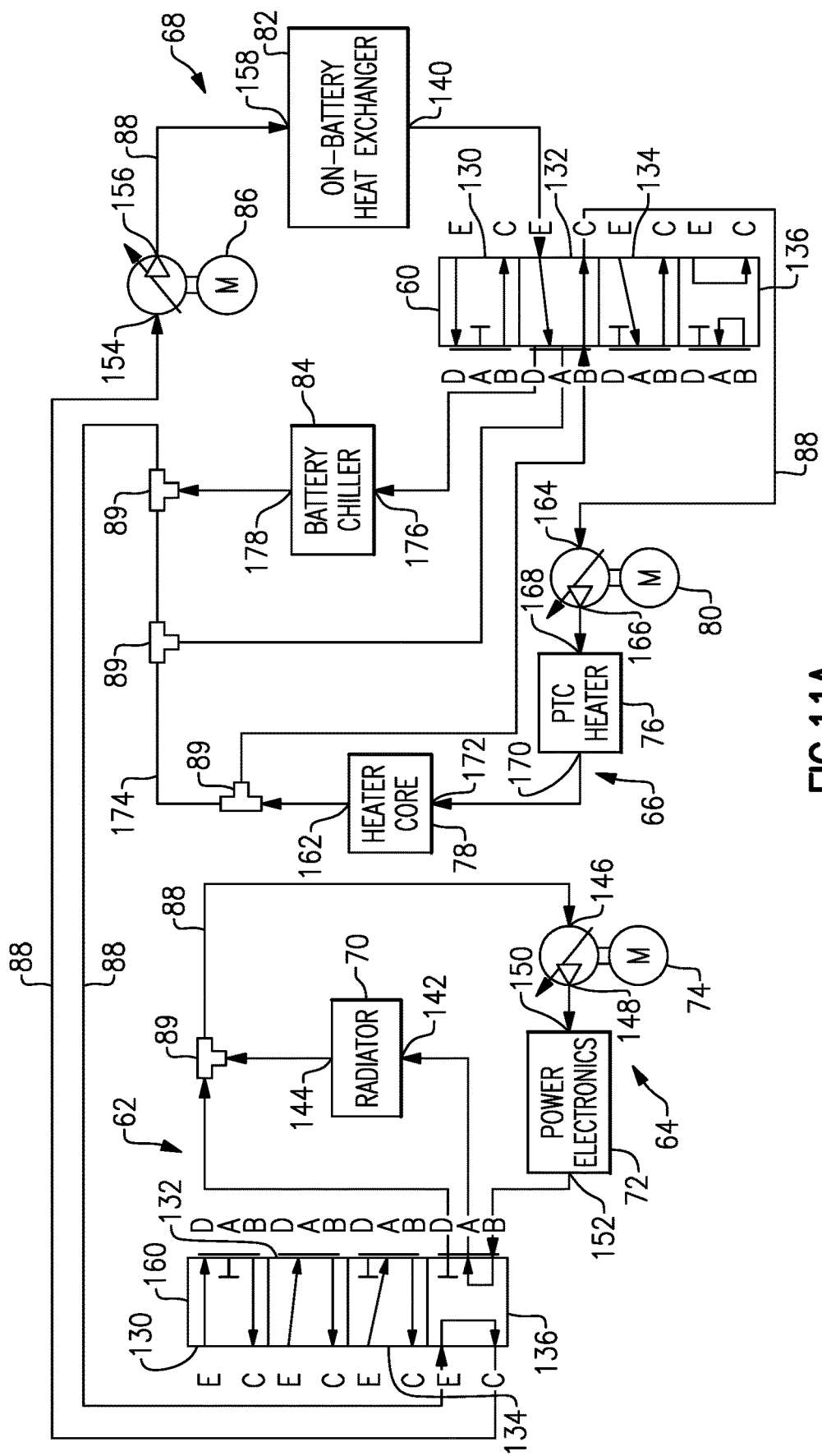
FIG. 11A is a schematic diagram of another operational condition.
Figure 11B:
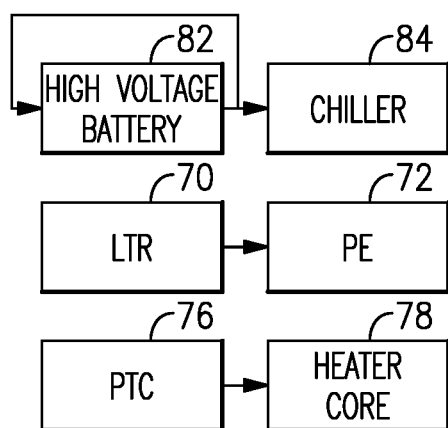
FIG. 11B is a block diagram showing what flows are connected to what subsystems for the operation condition shown in FIG. 11A.

FIGS. 11A-11B disclose mode 2.4, which isolates the PTC heater 76 and heater core 78 in a loop separate from the other loops, isolates the PE 72 and radiator 70 in a loop separate from all other loops, and loops the battery heat exchanger 82 with the chiller 84 in a split flow configuration. The outlet 140 from the battery heat exchanger 82 feeds into inlet port E in the second section 132 of the first valve 60, which connects to outlet port D and outlet port A of the second section 132 of the first valve 60. Flow from outlet port D enters the inlet 176 to the chiller 84, and the outlet 178 from the chiller 84 feeds into inlet port E of the fourth section 136 of the second valve 160, which connects to outlet port C of the fourth section 136 of the second valve 160. The outlet port C feeds back into the battery loop 68 via the inlet to the pump 86, and the outlet 156 of the pump 86 feeds into the inlet to the battery heat exchanger 82. Flow from the outlet port A of the second section 132 of the first valve 60 bypasses the chiller 84 and joins the flow exiting the chiller 84 that was introduced into the chiller 84 via the outlet port D of the second section 132 of the first valve 60. The joined flow then enters the fourth section 136 of the second valve 160 and is returned to the battery loop 68.

Within the heater loop 66, the outlet 162 of the heater core 78 feeds into the inlet port B of the second section 132 of the first valve 60. Due to the pressure differential at the pressure balancing hose 174, flow exiting the heater core 78 is directed back into the first valve 60. The inlet port B of the second section 132 of the first valve 60 connects to the outlet port C of the second section 132 of the first valve 60. The outlet port C feeds into the inlet 164 to the variable speed motor driven pump 80, and the outlet 166 of the pump 80 feeds into the inlet 168 to the PTC heater 76. The outlet 170 of the PTC heater 76 then directly connects to an inlet 172 of the heater core 78.

In another isolated loop configuration, the outlet 152 of the PE 72 connects to the inlet port B of the fourth section 136 of the second valve 160, which connects to the outlet port A of the fourth section 136 of the second valve 160. The outlet port A feeds into the inlet 142 to the radiator 70. The outlet 144 of the radiator feeds into the inlet 146 to the pump 74, and the outlet 148 from the pump 74 feeds into the inlet 150 to the PE 72 to cool the PE 72 in an isolated loop.

As shown in FIG. 11B, in mode 2.4, flow exiting the battery heat exchanger 82 is split between being directly returned to the battery heat exchanger 82 and being sent to the chiller 84. Flow exiting the chiller 84 is directed back into the inlet to the battery heat exchanger. Flow exiting the PTC heater 76 is directed to the heater core 78 and is then returned into the PTC heater 76 in an isolated loop. Flow exiting the radiator 70 is directed to the PE 72 and is then returned to the radiator 70 in an isolated loop.

Figure 12A:
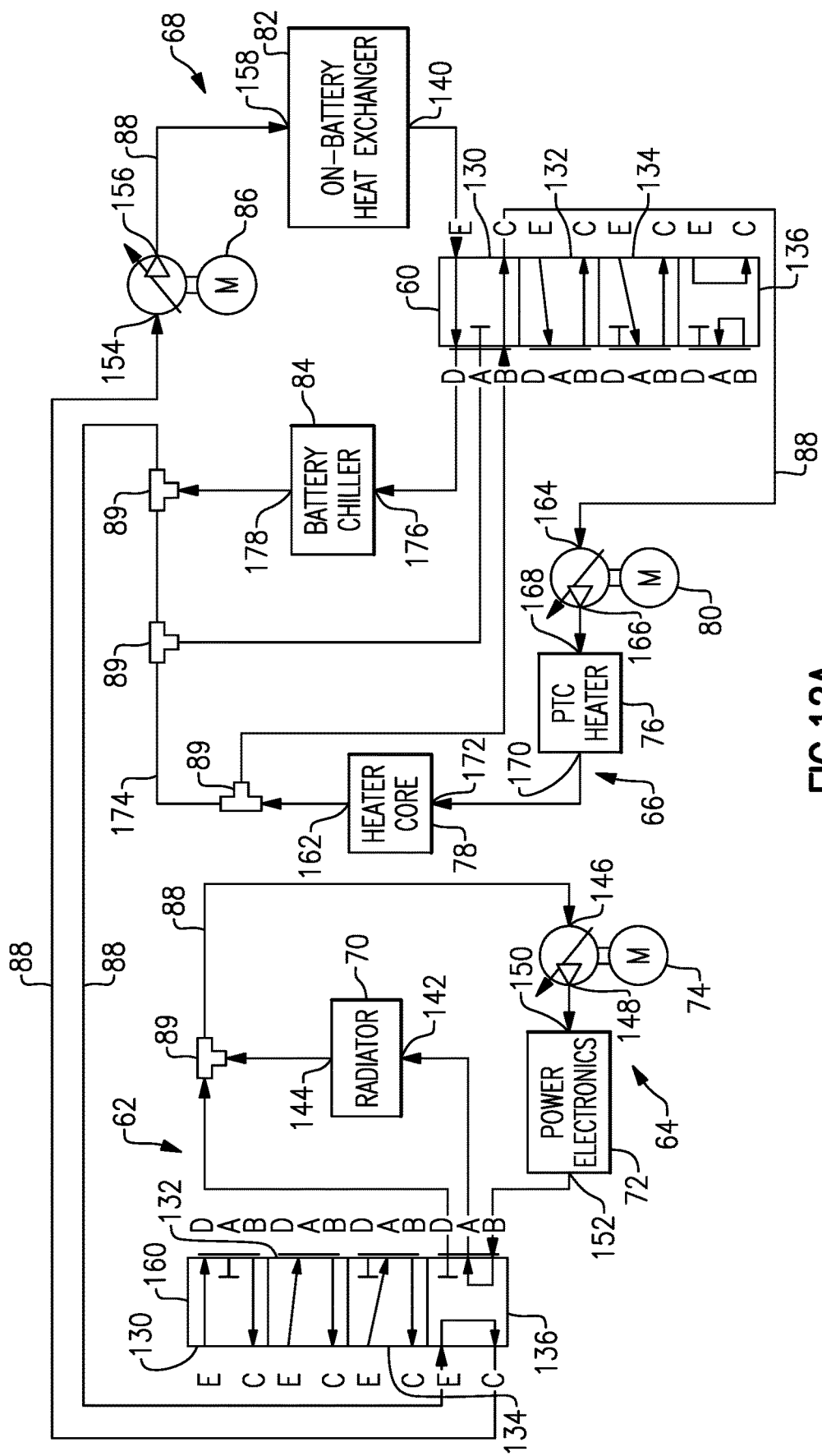
FIG. 12A is a schematic diagram of another operational condition.
Figure 12B:
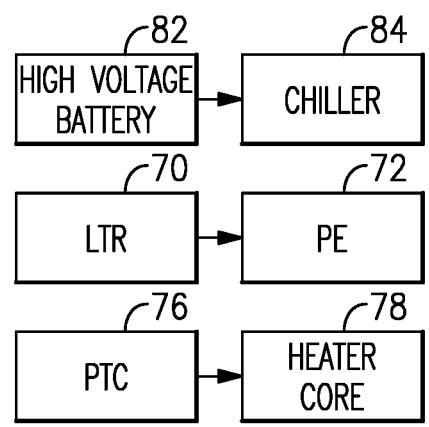
FIG. 12B is a block diagram showing what flows are connected to what subsystems for the operation condition shown in FIG. 12A.

FIGS. 12A-12B disclose mode 1.4, which isolates the PTC heater 76 and heater core 78 in a loop separate from the other loops, isolates the PE 72 and radiator 70 in a loop separate from all other loops, and loops the battery heat exchanger 82 with the chiller 84. The outlet 140 from the battery heat exchanger 82 feeds into inlet port E in the first section 130 of the first valve 60, which connects to outlet port D of the first section 132 of the first valve 60. Flow from outlet port D enters the inlet 176 to the chiller 84, and the outlet 178 from the chiller 84 feeds into inlet port E of the fourth section 136 of the second valve 160, which connects to outlet port C of the fourth section 136 of the second valve 160. The outlet port C feeds back into the battery loop 68 via the inlet 154 to the pump 86, and the outlet 156 of the pump 86 feeds into the inlet to the battery heat exchanger 82. Flow at outlet port A of the first section 130 of the first valve 60 is blocked such that all flow from the inlet port E is directed into the chiller 84, i.e. no flow bypasses the chiller 84.

Within the heater loop 66, the outlet 162 of the heater core 78 feeds into the inlet port B of the first section 130 of the first valve 60. Due to the pressure differential at the pressure balancing hose 174, flow exiting the heater core 78 is directed back into the first valve 60. The inlet port B of the first section 130 of the first valve 60 connects to the outlet port C of the first section 130 of the first valve 60. The outlet port C feeds into the inlet 164 to the variable speed motor driven pump 80, and the outlet 166 of the pump 80 feeds into the inlet 168 to the PTC heater 76. The outlet 170 of the PTC heater 76 then directly connects to an inlet 172 of the heater core 78.

In another isolated loop configuration, the outlet 152 of the PE 72 connects to the inlet port B of the fourth section 136 of the second valve 160, which connects to the outlet port A of the fourth section 136 of the second valve 160. The outlet port A feeds into the inlet 142 to the radiator 70. The outlet 144 of the radiator feeds into the inlet 146 to the pump 74, and the outlet 148 from the pump 74 feeds into the inlet 150 to the PE 72 to cool the PE 72 in an isolated loop.

As shown in FIG. 12B, in mode 1.4, flow exiting the battery heat exchanger 82 is directly sent to the chiller 84 and then returned to the battery heat exchanger 82. Flow exiting the PTC heater 76 is directed to the heater core 78 and is then returned into the PTC heater 76 in an isolated loop. Flow exiting the radiator 70 is directed to the PE 72 and is then returned to the radiator 70 in an isolated loop.

Figure 13A:
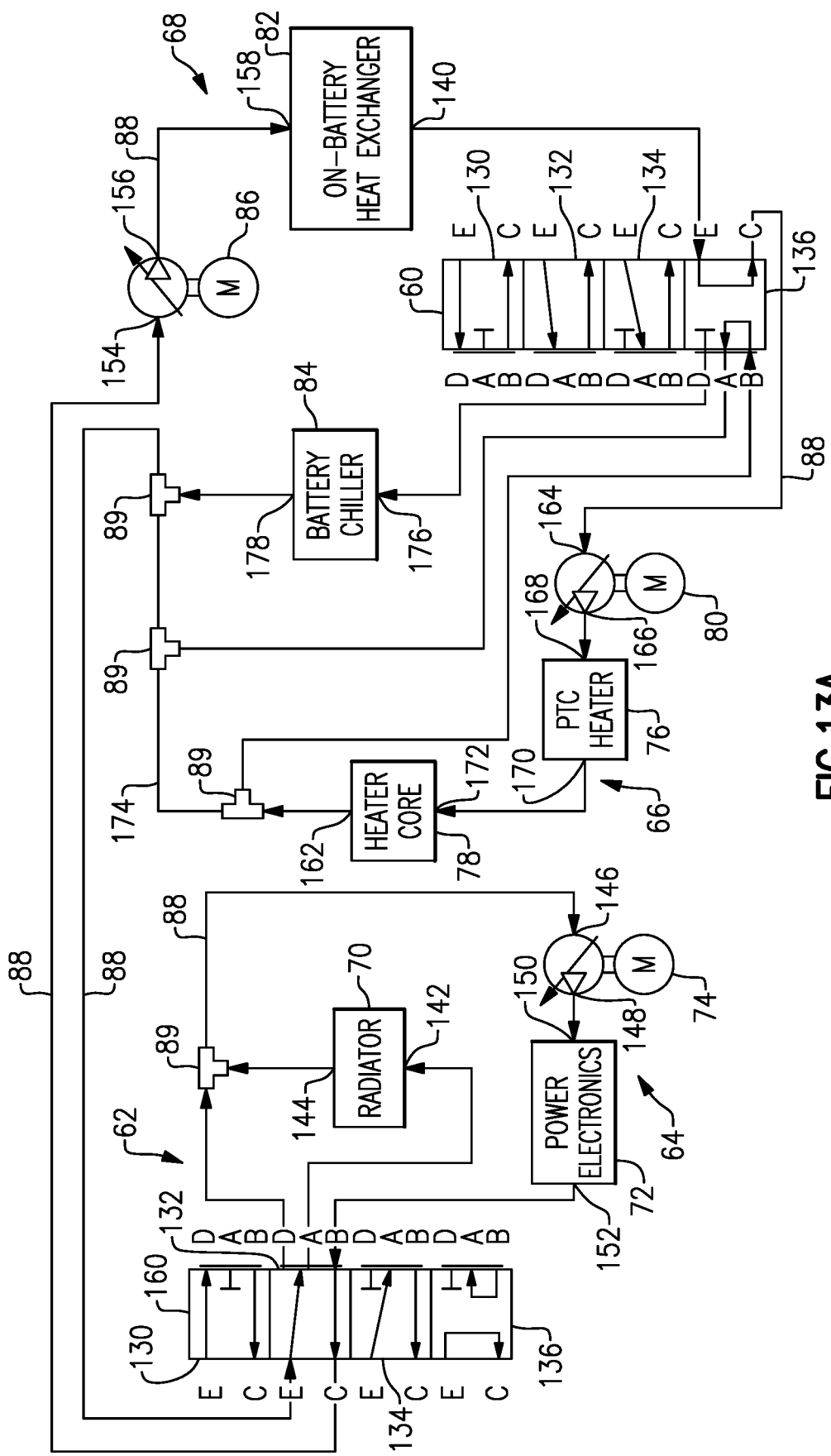
FIG. 13A is a schematic diagram of another operational condition.
Figure 13B:
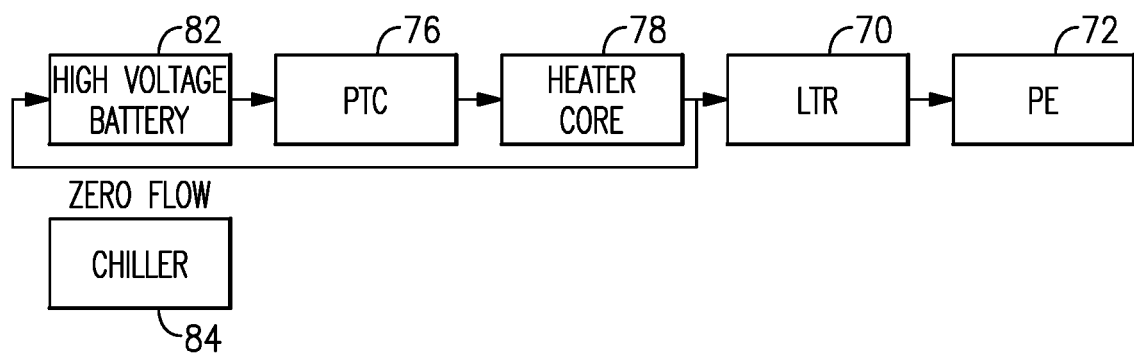
FIG. 13B is a block diagram showing what flows are connected to what subsystems for the operation condition shown in FIG. 13A.

FIGS. 13A-13B disclose mode 4.2, which provides a split flow configuration. The outlet 140 from the battery heat exchanger 82 feeds into inlet port E of the fourth section 136 of the first valve 60, which connects to the outlet port C of the fourth section 136 of the first valve 60. The outlet port C feeds into the inlet 164 to the pump 74 and the outlet 166 of the pump 74 feeds into the inlet 168 to PTC heater 76. The outlet 170 of the PTC heater 76 feeds into the inlet 172 to the heater core 78, and the outlet 162 of the heater core 78 feeds into the inlet port B of the fourth section 136 of the first valve 60. The inlet port B connects to the outlet port A of the fourth section 136 of the first valve 60. Flow is blocked at outlet port D such that no flow is directed into the chiller 84. The outlet port A of the fourth section 136 of the first valve 60 connects to the inlet port E of the second section 132 of the second valve 160, which connects to both outlet port D and outlet port A of the second section 132 of the second valve 160 in a split configuration. Flow from outlet port D bypasses the radiator 70 and is directed into the pump 74, and then into PE 72. Flow from outlet port A is directed into the radiator 70 and flow exiting from radiator joins the flow from outlet port D before being directed into the pump 74 and PE 72. Flow exiting the PE 72 feeds into inlet port B of the second section 132 of the second valve 160 which connects to outlet port C of the second section 132 of the second valve 160. Outlet port C feeds back into the pump 86 and battery heat exchanger 82 in the battery loop 68.

As shown in FIG. 13B, the flow exiting the battery heat exchanger 82 is directed into the PTC heater 76, which is then directed into the heater core 78. Flow exiting the heater core 78 is split with a portion of the flow being directed into the radiator 70 and the PE 72 before being directed back into the battery heat exchanger 82. Another portion of the flow exiting the heater core 78 is sent directly back to the battery heat exchanger 82. There is zero flow through the chiller 84.

Figure 14A:
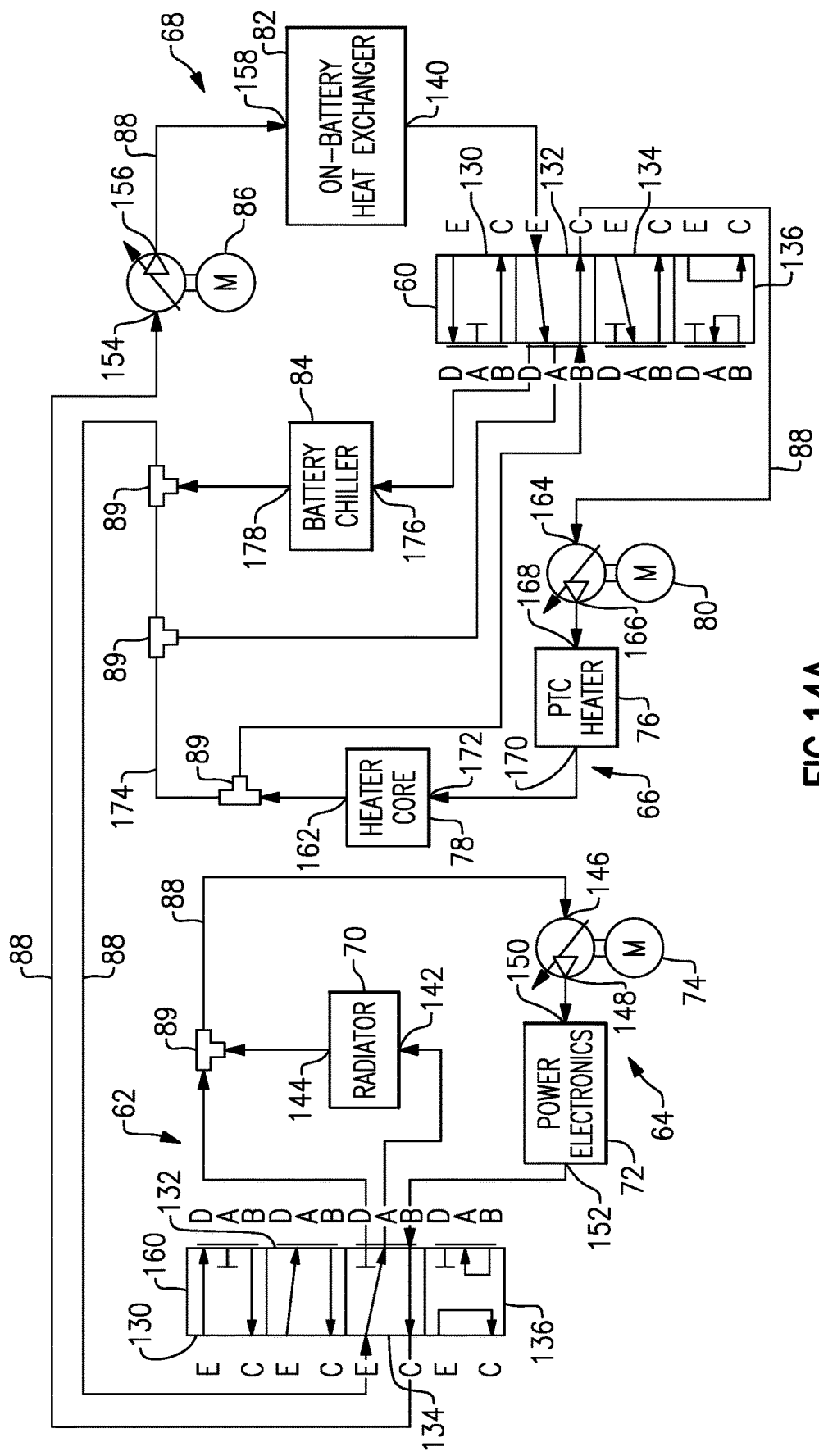
FIG. 14A is a schematic diagram of another operational condition.
Figure 14B:
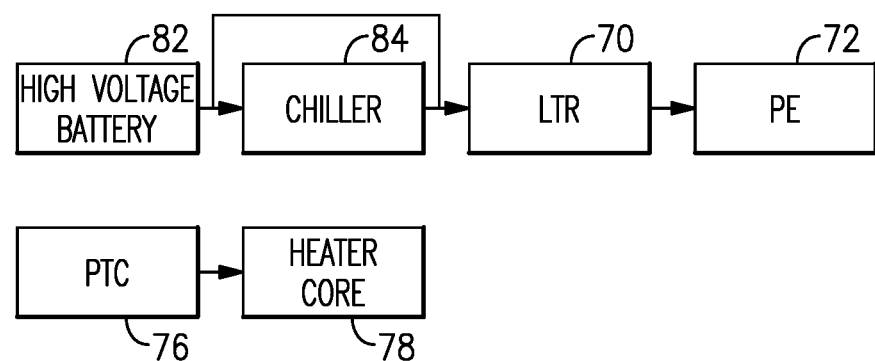
FIG. 14B is a block diagram showing what flows are connected to what subsystems for the operation condition shown in FIG. 14A.

FIGS. 14A-14B disclose mode 2.3, which connects PTC heater 76 and heater core 78 in a loop, while also connecting the battery heat exchanger 82 to the radiator 70 and PE 72 in series with split flow through and around the chiller 84. The outlet 140 from the battery heat exchanger 82 feeds into the inlet port E of the second section 132 of the first valve 60, which connects to the both the outlet port D and the outlet port A of the second section 132 of the first valve 60 in a split configuration. Flow exiting outlet port D enters the battery chiller 84. Flow exiting outlet port A bypasses the chiller 84 and joins the flow exiting the chiller 84. Flow bypassing the chiller 84 and exiting the chiller 84 is directed into inlet port E of the third section 134 of the second valve 160, which connects to outlet port A of the third section 134 of the second valve 160. Flow from the outlet port A is directed into the radiator 70. Flow is blocked at outlet port D such that all flow is directed into the radiator 70, i.e. no flow bypasses the radiator 70. Flow exiting the radiator is then directed into the pump 74 and PE 72. Flow exiting the PE 72 connects to inlet port B of the third section 134 of the second valve 160, which connects to outlet port C. Flow exiting outlet port C is directed into the pump 86 and battery heat exchanger 82 in the battery loop 68.

Within the heater loop 66, the outlet 162 of the heater core 78 feeds into the inlet port B of the second section 132 of the first valve 60. Due to the pressure differential at the pressure balancing hose 174, flow exiting the heater core 78 is directed back into the first valve 60. The inlet port B of the second section 132 of the first valve 60 connects to the outlet port C of the second section 132 of the first valve 60. The outlet port C feeds into the inlet 164 to the variable speed motor driven pump 80, and the outlet 166 of the pump 80 feeds into the inlet 168 to the PTC heater 76. The outlet 170 of the PTC heater 76 then directly connects to an inlet 172 of the heater core 78.

As shown in FIG. 14B, in mode 2.3, flow exiting the battery heat exchanger 82 has one portion directed into the chiller 84 and another portion that can bypass the chiller 84. The bypass flow and the flow exiting the chiller 84 is then directed into the radiator 70, which is then directed into the PE 72 before being send back to the battery heat exchanger. Flow from the PTC heater 76 is directed into the heater core 78 which is then directed back into the PTC heater 76 in an isolated loop.

Figure 15A:
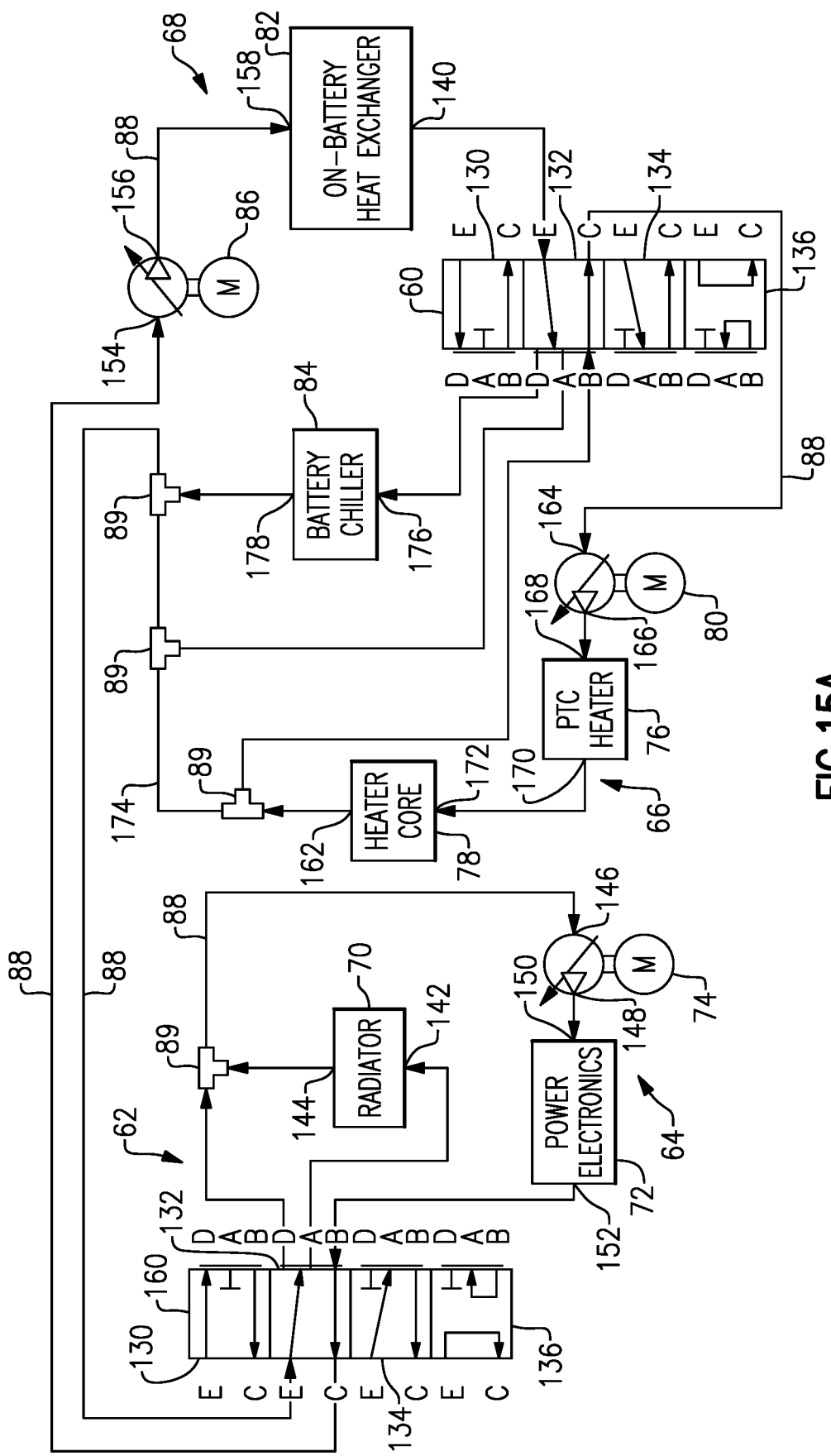
FIG. 15A is a schematic diagram of another operational condition.
Figure 15B:
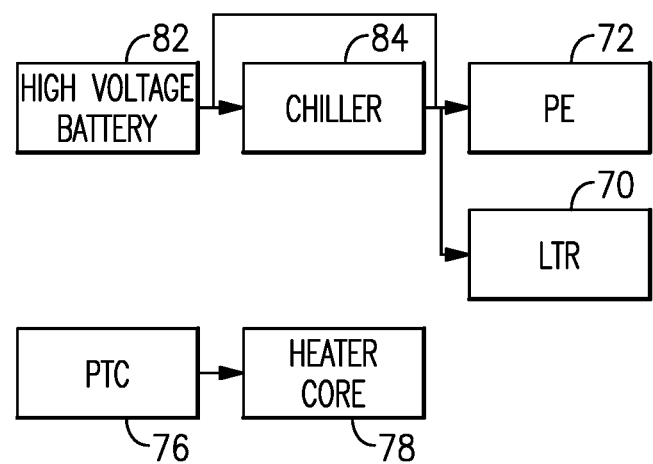
FIG. 15B is a block diagram showing what flows are connected to what subsystems for the operation condition shown in FIG. 15A.

FIGS. 15A-15B disclose mode 2.2, which connects PTC heater 76 and heater core 78 in a loop, while also connecting the battery heat exchanger 82 to the radiator 70 and PE 72 in parallel with split flow through and around the chiller 84. The outlet 140 from the battery heat exchanger 82 connects to the inlet port E of the second section 132 of the first valve 60, which connects to outlet port D and outlet port A of the second section 132 of the first valve 60. Flow exiting port A bypasses the chiller 84. Flow exiting outlet port D enters the chiller 84. Flow bypassing the chiller 84 and the flow exiting the chiller 84 is then directed into inlet port E of the second section 132 of the second valve 160, which connects to outlet port D and outlet port A of the second section 132 of the second valve 160. Flow exiting outlet port D bypasses the radiator 70. Flow exiting outlet port A enters the radiator 70. Flow bypassing the radiator 70 and flow exiting the radiator are then directed into the pump 74 and PE 72. Flow exiting the PE 72 is directed into inlet port B of the second section 132 of the second valve 160, which connects to outlet port C of the second section 132 of the second valve 160. Flow exiting outlet port C is then directed into pump 86 and battery heat exchanger 82 of the battery loop 68.

Within the heater loop 66, the outlet 162 of the heater core 78 feeds into the inlet port B of the second section 132 of the first valve 60. Due to the pressure differential at the pressure balancing hose 174, flow exiting the heater core 78 is directed back into the first valve 60. The inlet port B of the second section 132 of the first valve 60 connects to the outlet port C of the second section 132 of the first valve 60. The outlet port C feeds into the inlet 164 to the variable speed motor driven pump 80, and the outlet 166 of the pump 80 feeds into the inlet 168 to the PTC heater 76. The outlet 170 of the PTC heater 76 then directly connects to an inlet 172 of the heater core 78.

As shown in FIG. 15B, flow exiting the battery heat exchanger 82 can be split such that a portion can bypass the chiller 84. Another portion feeds into the battery chiller 84. Flow bypassing and exiting the battery chiller 84 can then be directed into the radiator 70 or directly into the PE 72 by bypassing the radiator 70. Flow exiting the PTC heater 76 is directed into the heater core 78 and flow exiting the heater core 78 is then returned to the PTC heater 76.

Figure 16A:
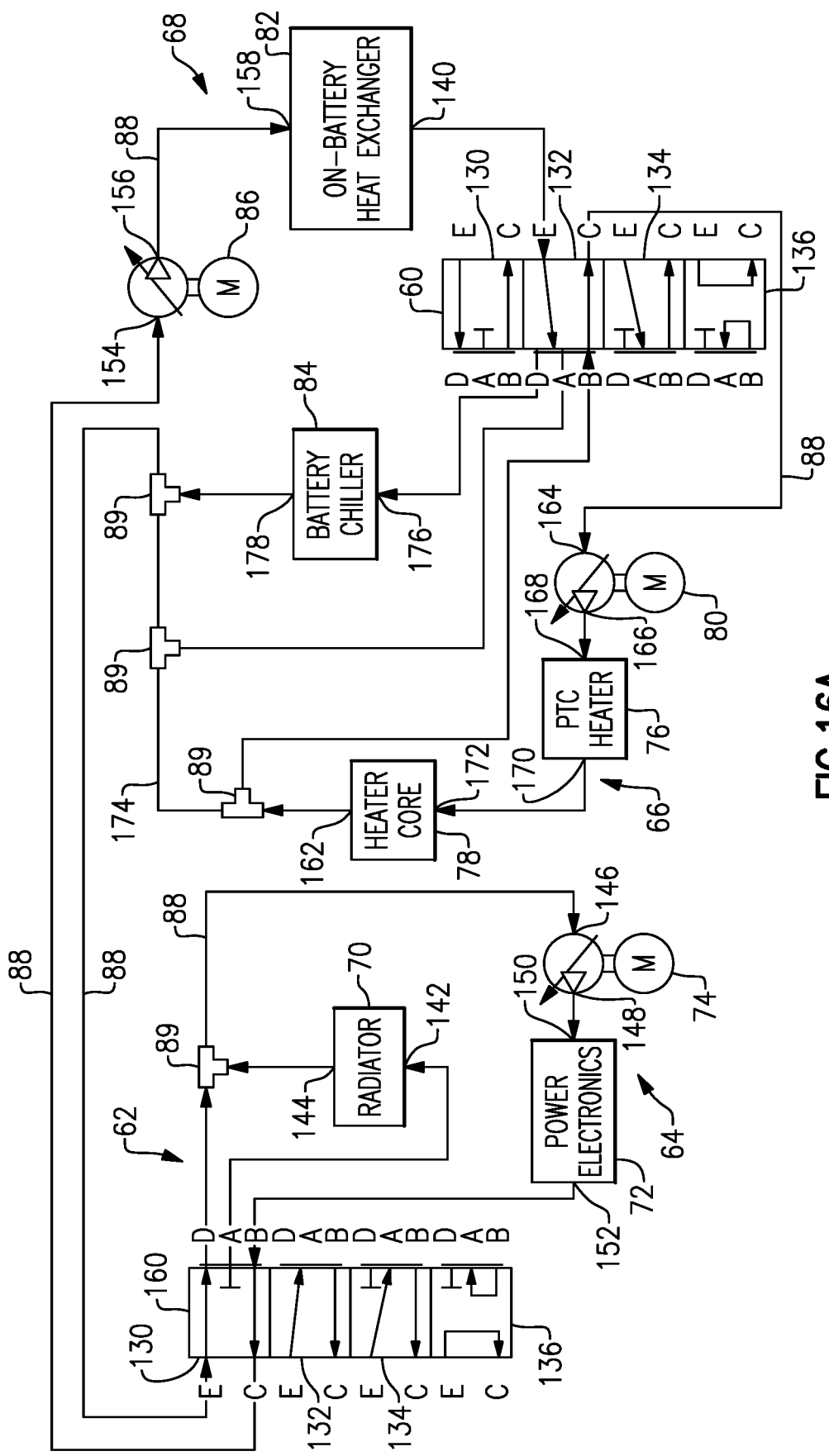
FIG. 16A is a schematic diagram of another operational condition.
Figure 16B:
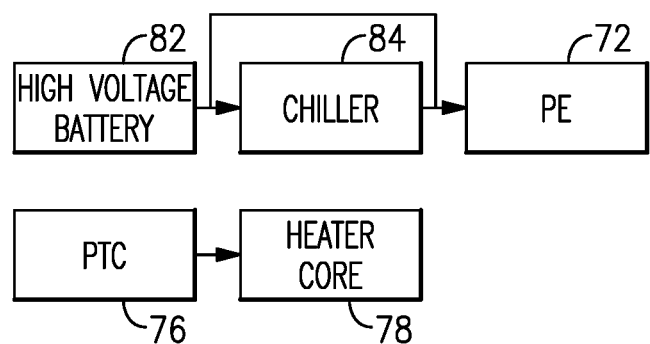
FIG. 16B is a block diagram showing what flows are connected to what subsystems for the operation condition shown in FIG. 16A.

FIGS. 16A-16B disclose mode 2.1, which connects PTC heater 76 and heater core 78 in a loop, while also connecting the battery heat exchanger 82 to the PE 72 with split flow through and around the chiller 84. The outlet 140 from the battery heat exchanger 82 connects to the inlet port E in the second section 132 of the second valve 60, which then connects to outlet port D and outlet port A in a split configuration. Flow exiting outlet port D is directed into the chiller 84. Flow exiting outlet port A bypasses the chiller 84. Flow bypassing and exiting the chiller 84 is then directed into the inlet port E of the first section 130 of the second valve 160, which connects to outlet port D of the first section 130 of the second valve 160. Flox is blocked at outlet port A such that no flow enters the radiator 70. Flow from outlet port D bypasses the radiator 70 and is directed into the pump 74 and PE 72. Flow exiting the PE 72 feeds into inlet port B of the first section 130 of the second valve 160, which then connects to outlet port C of the first section 130 of the second valve 160. Flow of the outlet port C is directed into the pump 86 and battery heat exchanger of the battery loop 68.

Within the heater loop 66, the outlet 162 of the heater core 78 feeds into the inlet port B of the second section 132 of the first valve 60. Due to the pressure differential at the pressure balancing hose 174, flow exiting the heater core is directed back into the first valve 60. The inlet port B of the second section 132 of the first valve 60 connects to the outlet port C of the second section 132 of the first valve 60. The outlet port C feeds into the inlet 164 to the variable speed motor driven pump 80, and the outlet 166 of the pump 80 feeds into the inlet 168 to the PTC heater 76. The outlet 170 of the PTC heater 76 then directly connects to an inlet 172 of the heater core 78.

As shown in FIG. 16B, in mode 2.1, flow exiting the battery heat exchanger 82 can be split between bypassing the chiller 84 and going through the chiller 84. Flow bypassing and exiting the chiller 84 is then directed into the PE 72 before being returned to the battery heat exchanger. Flow exiting the PTC heater 76 is directed into the heater core 78 and flow exiting the heater core 78 is then returned to the PTC heater 76.

Figure 17A:
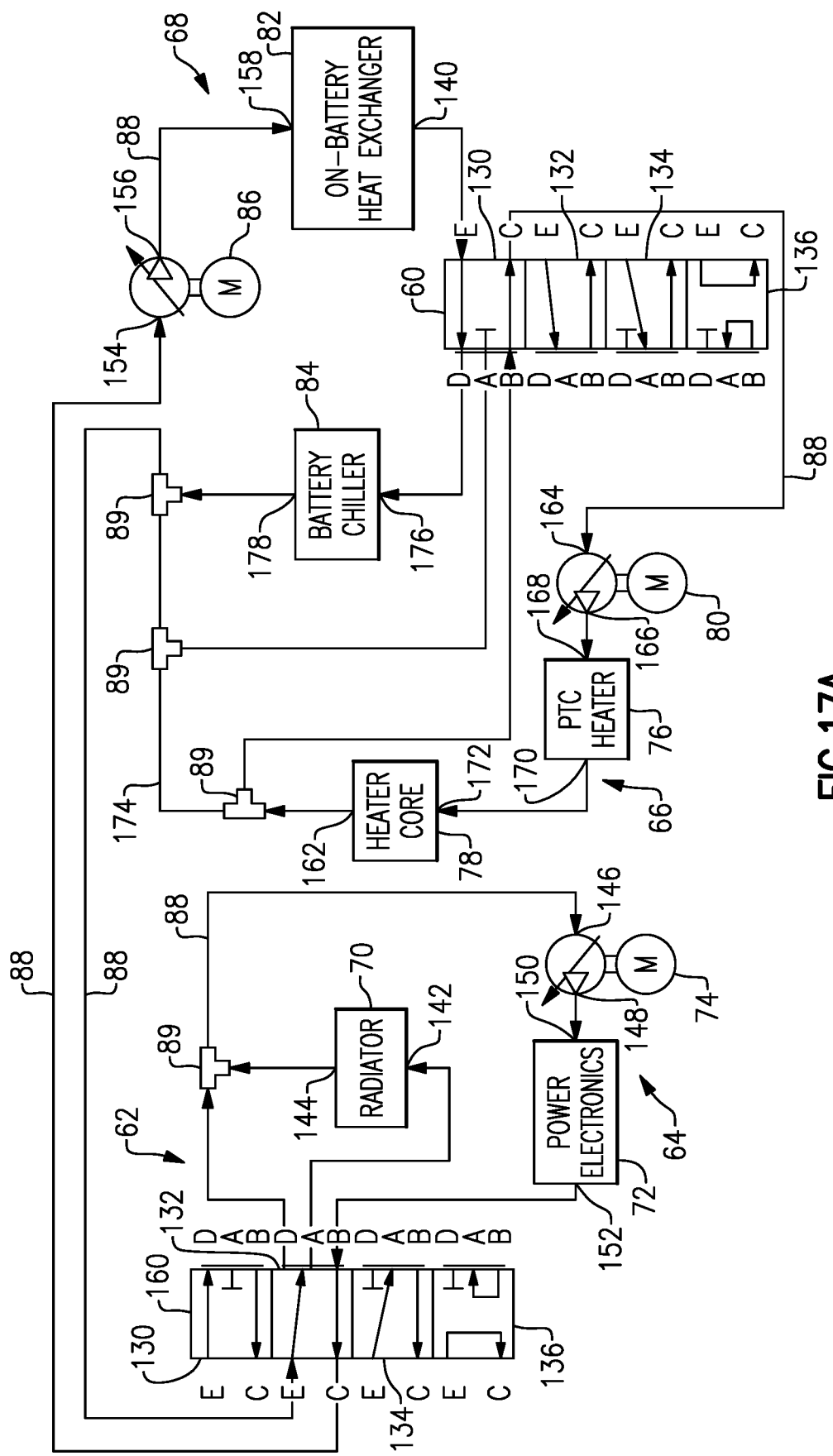
FIG. 17A is a schematic diagram of another operational condition.
Figure 17B:
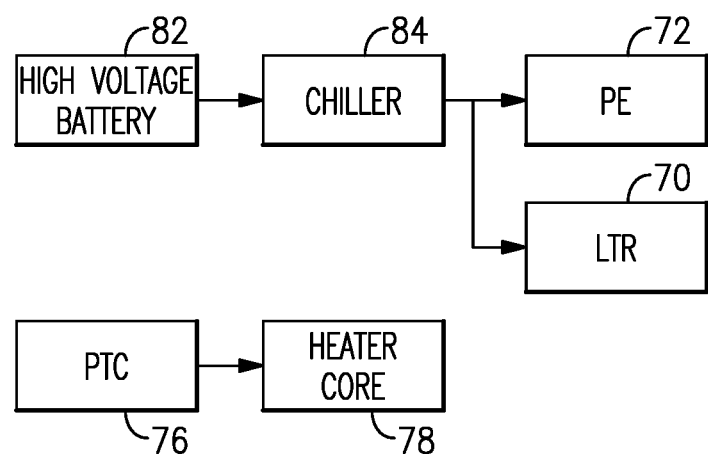
FIG. 17B is a block diagram showing what flows are connected to what subsystems for the operation condition shown in FIG. 17A.

FIGS. 17A-17B disclose mode 1.2, which connects PTC heater 76 and heater core 78 in a loop, while also connecting the battery heat exchanger 82 to the chiller 84 which then directs flow into the PE 72 and radiator 70 in parallel. The outlet 140 from the battery heat exchanger 82 feeds into the inlet port E of the first section 130 of the first valve 60, which connects to outlet port D of the first section of the first valve 60. Outlet port D flows into the chiller 84 and flow exiting the chiller 84 feeds into inlet port E of the second section 132 of the second valve 160, which connects to outlet port D and outlet port A of the second section 132 of the second valve 160. Flow exiting outlet port D bypasses the radiator 70. Flow exiting outlet port A enters the radiator 70. Flow bypassing and exiting the radiator 70 is then directed into pump 74 and PE 72. Flow exiting the PE 72 is directed into inlet port B of the second section 132 of the second valve 160, which connects to outlet port C of the second section 132 of the second valve 160. Flow from outlet port C is then directed into the pump 86 and battery heat exchanger 82 of the battery loop 68.

Within the heater loop 66, the outlet 162 of the heater core 78 feeds into the inlet port B of the first section 130 of the first valve 60. Due to the pressure differential at the pressure balancing hose 174, flow exiting the heater core 78 is directed back into the first valve 60. The inlet port B of the first section 130 of the first valve 60 connects to the outlet port C of the first section 130 of the first valve 60. The outlet port C feeds into the inlet 164 to the variable speed motor driven pump 80, and the outlet 166 of the pump 80 feeds into the inlet 168 to the PTC heater 76. The outlet 170 of the PTC heater 76 then directly connects to an inlet 172 of the heater core 78.

As shown in FIG. 17B, flow exiting the battery heat exchanger 82 is directed into the chiller 84 and flow exiting the chiller 84 is then sent directly into the PE 72 by bypassing the radiator 70 or enters the radiator 70 and is then directed into the PE 72. Flow from the PE 72 is then directed back into the battery heat exchanger 82. Flow exiting the PTC heater 76 is directed into the heater core 78 and flow exiting the heater core 78 is returned to the PTC heater 76.

Figure 18A:
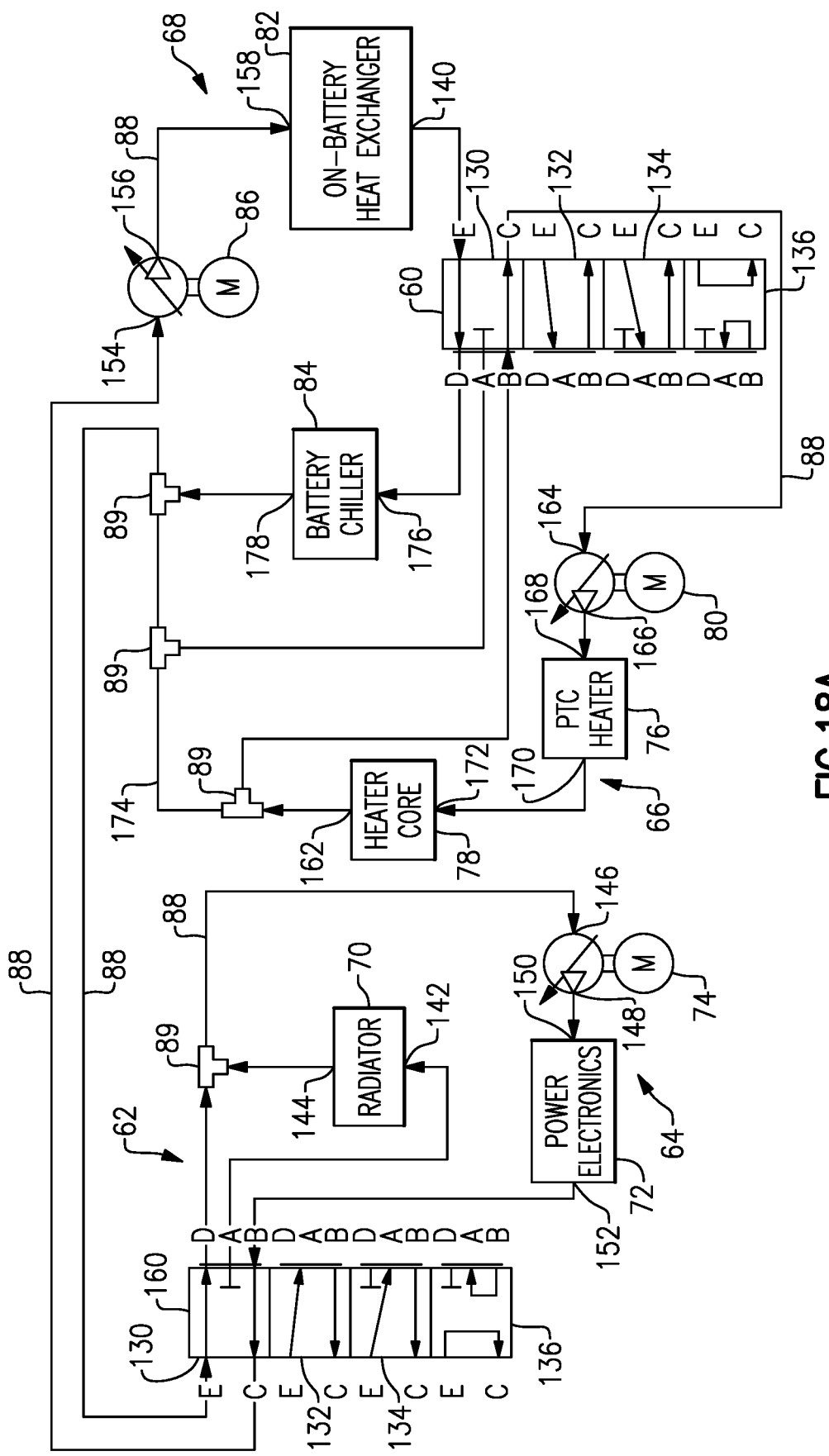
FIG. 18A is a schematic diagram of another operational condition.
Figure 18B:
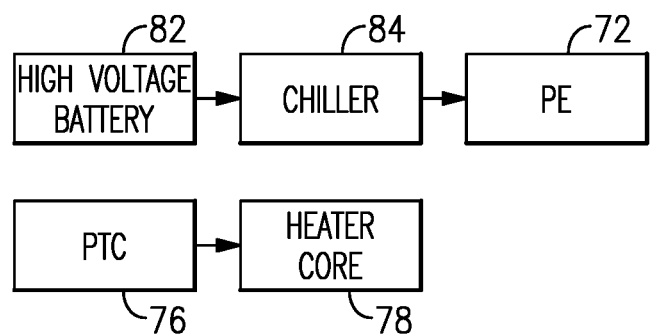
FIG. 18B is a block diagram showing what flows are connected to what subsystems for the operation condition shown in FIG. 18A.

FIGS. 18A-18B disclose mode 1.1, which connects PTC heater 76 and heater core 78 in a loop, while also connecting the battery heat exchanger 82 to the chiller 84 which then directs flow into the PE 72. The outlet 140 from the battery heat exchanger 82 feeds into the inlet port E of the first section 130 of the first valve 60, which connects to outlet port D of the first section 130 of the first valve 60. Flow is blocked at outlet port A such that flow cannot bypass the chiller 84. Outlet port D flows into the chiller 84 and flow exiting the chiller 84 feeds into inlet port E of the first section 130 of the second valve 160, which connects to outlet port D. Flow is blocked at outlet port A of the second section 132 of the second valve 160 such that flow bypasses the radiator 70. Flow exiting outlet port D bypasses the radiator 70. And is then directed into pump 74 and PE 72. Flow exiting the PE 72 is directed into inlet port B of the first section 130 of the second valve 160, which connects to outlet port C of the first section 130 of the second valve 160. Flow from outlet port C is then directed into the pump 86 and battery heat exchanger 82 of the battery loop 68.

Within the heater loop 66, the outlet 162 of the heater core 78 feeds into the inlet port B of the first section 130 of the first valve 60. Due to the pressure differential at the pressure balancing hose 174, flow exiting the heater core 78 is directed back into the first valve 60. The inlet port B of the first section 130 of the first valve 60 connects to the outlet port C of the first section 130 of the first valve 60. The outlet port C feeds into the inlet 164 to the variable speed motor driven pump 80, and the outlet 166 of the pump 80 feeds into the inlet 168 to the PTC heater 76. The outlet 170 of the PTC heater 76 then directly connects to an inlet 172 of the heater core 78.

As shown in FIG. 18B, flow exiting the battery heat exchanger 82 is directed into the chiller 84 and flow exiting the chiller 84 is then sent directly into the PE 72 by bypassing the radiator 70. Flow from the PE 72 is then directed back into the battery heat exchanger 82. Flow exiting the PTC heater 76 is directed into the heater core 78 and flow exiting the heater core 78 is returned to the PTC heater 76.

Additionally, in an optional arrangement, the heater loop 66 in any of the configurations discussed above may optionally include a primary engine cooling circuit where an outlet of the heater core 78 would be connected to an inlet to an engine block of the engine 14. The engine block would direct flow to a cylinder head (not shown) and the outlet of the cylinder heat would lead to a valve inlet. In configurations that do not include the engine block and cylinder head, the outlet from the heater core 78 goes directly to a valve inlet as shown in FIGS. 3A-18B.

The disclosed glycol based hydraulic system uses the two valves in conjunction with the radiator loop, power electronics loop, heater loop, and battery loop to provide various desired operational conditions. The disclosed system provides for the ability to maintain heater core inlet temperatures while also providing heat to the battery. Additionally, the system has the ability to take heat which is usually rejected through the radiator to be used to warm the battery independently. The use of two identical valves allows the battery and power electronics loops to be joined while also hydraulically bypassing the radiator. The system is also able to continually deaerate for service fill.

One benefit of the two valve system is that the power electronics loop can send waste heat to the battery while bypassing the radiator. This particular mode, referred to above as mode 3.1 allows the cabin to maintain a higher heater core inlet temperature versus the battery warming temperature, allowing the battery to be warmed while not on-plug/off-charge.

Additional beneficial modes include: battery heating off plug while independently heating the cabin using strictly a glycol system; the PE and battery being actively chilled by the refrigeration system while actively heating the cabin with the glycol system; and using waste heat from the power electronics to heat the battery independently or additively through a PTC to heat the cabin.

The subject disclosure provides thermal management of electrified powertrains by using hydraulic circuit manipulation. By separating components of similar operating temperatures, as well as allowing each group of components to transfer heat between other groups, substantial thermal efficiencies are gained. The two hydraulic valves 60, 160 are configured to deliver heat transfer under various vehicle conditions for four different loops within sixteen different modes as described above. The valves 60, 160 allow these loops to connect to each other, allows multiple loops to be connected, and allows multiple loops to be isolated. By allowing these loops to be connected and isolated under various vehicle conditions, the energy usage of the vehicle can be reduced while also minimizing the required hardware.

The disclosed system is unique in that there is capability to both liquid heat the cabin and battery using a single PTC heater and PE waste heat both simultaneously and independently. This system is unique in that there is only one PTC for the vehicle and can still heat the battery and cabin simultaneously or independently. The capability of this hydraulic architecture can be enhanced by altering the flows between the battery, power electronics, heater core and PTC to optimize energy usage versus customer demand for heating and battery demand for heating.

In one example, the system has the ability to supplement the PTC heat with PE heat for cabin warm up at lower heater core inlet temperatures. This is a condition which the customer is not in the vehicle when high heater core inlet temperatures would be requested. This condition would allow incremental heating of the cabin more than what the PTC heater alone would be able to deliver.

Another example would be the ability to utilize a heat pump to utilize three sources of heat: ambient; PE; and battery through the chiller to the compressor to the water cooled condenser in the heater loop.

Additionally, this system works well with batteries with different chemistry than just traditional Lithium-Nickel-Manganese-Cobalt-Oxide (NMC) batteries. Battery chemistries such as LFP require heat input at low battery temperatures to allow the battery to maintain energy capacity. The system is able to heat the battery and the cabin simultaneously. In one example with traditional batteries, the PTC heater as a single heat source is used only while the vehicle is on-plug or charging. The reason is that the battery absorbs substantial heat, reducing the heater core inlet temperature to levels far lower than what warming the cabin separately (30° C.) heater core inlet temperatures versus heater core inlet temperatures (90° C.). However, battery technology for LFP requires battery heating while operating, not just on-plug, and with a higher heater core inlet temperature.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A thermal management system comprising:
a heater loop, a battery loop, a radiator loop, and a power electronics loop operating within a glycol system;
a first valve in fluid communication with one or more of the heater loop, the battery loop, the radiator loop, and the power electronics loop;

a second valve in fluid communication with one or more of the heater loop, the battery loop, the radiator loop, and the power electronics loop;

wherein the second valve is fluidly connected to the first valve to provide at least one operational condition where waste heat from power electronics in the power electronics loop is used to heat a battery in the battery loop, and wherein each of the first valve and the second valve includes a plurality of discrete sections comprising at least four sections, with each discrete section having a plurality of ports;

wherein the plurality of ports comprises a set of ports for each discrete section that is separate from sets of ports for other remaining discrete sections, and wherein each set of ports comprises at least five ports; and wherein each of the first valve and the second valve include four different modes for a total of sixteen different usable modes when combined with each other.

2. The system according to claim 1, wherein the at least one operational condition comprises a plurality of operational conditions, and including a system controller that controls the first valve and the second valve to manage heat transfer for the plurality of operational conditions.

3. The system according to claim 2, wherein the plurality of operational conditions includes at least a first operational condition where the waste heat from the power electronics is used to heat the battery independently or additively through a PTC heater to heat a cabin area.

4. The system according to claim 3, wherein during the first operational condition, the power electronics loop is used to heat a battery in the battery loop while bypassing the radiator loop.

5. The system according to claim 4, wherein, when in the first operational condition, the heater loop includes a PTC heater and a heater core, and wherein the first valve isolates the heater loop from all other loops such that the PTC heater and the heater core are directly looped together, and wherein when in the first operational condition, the first valve and the second valve cooperate with each other such that there is no flow through a radiator in the radiator loop and no flow through a battery chiller in the battery loop.

6. The system according to claim 1, wherein the first valve and the second valve are the only valves within the thermal management system.

7. The system according to claim 1, including a refrigerant system that is used to cool a cabin area, wherein the refrigerant system includes a chiller and a refrigerant heat exchanger, and wherein the refrigerant heat exchanger fluidly communicates with ambient atmosphere for cooling/heating and the chiller fluidly communicates with the glycol system for cooling/heating.

8. The system according to claim 7, including a heat pump to provide heating from the refrigerant system to the glycol system.

9. The system according to claim 1, wherein the second valve is fluidly connected to the first valve to provide battery heating within the battery loop while a vehicle is off charge, and while also being able to independently heat a cabin.

10. The system according to claim 1, wherein each port is fluidly connectable to one or more of the heater loop, the battery loop, the radiator loop, and the power electronics loop.

11. A thermal management system comprising:
a heater loop, a battery loop, a radiator loop, and a power electronics loop operating within a glycol system;

a first valve in fluid communication with one or more of the heater loop, the battery loop, the radiator loop, and the power electronics loop;

a second valve in fluid communication with one or more of the heater loop, the battery loop, the radiator loop, and the power electronics loop; and wherein the second valve is fluidly connected to the first valve to provide at least one operational condition where waste heat from power electronics in the power electronics loop is used to heat a battery in the battery loop;

wherein the at least one operational condition comprises a plurality of operational conditions, and including a system controller that controls the first valve and the second valve to manage heat transfer for the plurality of operational conditions;

wherein the plurality of operational conditions includes at least a first operational condition where the waste heat from the power electronics is used to heat the battery independently or additively through a PTC heater to heat a cabin area;

wherein during the first operational condition, the power electronics loop is used to heat a battery in the battery loop while bypassing the radiator loop;

wherein, when in the first operational condition, the heater loop includes a PTC heater and a heater core, and wherein the first valve isolates the heater loop from all other loops such that the PTC heater and the heater core are directly looped together, and wherein when in the first operational condition, the first valve and the second valve cooperate with each other such that there is no flow through a radiator in the radiator loop and no flow through a battery chiller in the battery loop; and wherein each of the first valve and the second valve includes a first section, a second section, a third section, and a fourth section, and wherein each of the first section, the second section, the third section, and the fourth section include an outlet port A, an inlet port B, an outlet port C, an outlet port D, and an inlet port E, and wherein when in the first operational condition:

an outlet from a battery heat exchanger in the battery loop connects to inlet port E in the third section of the first valve, flow to the battery chiller blocked via outlet port D in the third section of the first valve such that there is no flow through the battery chiller, inlet port E in the third section connects to outlet port A in the third section of the first valve such that flow can bypass the battery chiller, outlet port A in the third section of the first valve feeds into inlet port E of the first section of the second valve which fluidly connects to the outlet port D of the first section of the second valve, the outlet port D of the first section of the second valve connects to the power electronics loop, flow is blocked at outlet port A in the first section of the second valve such that all flow through the first section of the second valve bypasses the radiator, flow exiting power electronics in the power electronics loop feeds into the inlet port B of the first section of the second valve which connects to outlet port C of the first section of the second valve, and outlet port C of the first section of the second valve feeds back into the battery loop to heat the battery.

12. A thermal management system comprising:
a heater loop, a battery loop, a radiator loop, and a power electronics loop operating within a glycol system;

a first valve in fluid communication with one or more of the heater loop, the battery loop, the radiator loop, and the power electronics loop;

a second valve in fluid communication with one or more of the heater loop, the battery loop, the radiator loop, and the power electronics loop;

wherein the second valve is fluidly connected to the first valve to provide at least one operational condition where waste heat from power electronics in the power electronics loop is used to heat a battery in the battery loop, and wherein each of the first valve and the second valve includes a plurality of discrete sections, with each discrete section having a plurality of ports;

wherein the at least one operational condition comprises a plurality of operational conditions, and including a system controller that controls the first valve and the second valve to manage heat transfer for the plurality of operational conditions;

wherein the plurality of operational conditions includes at least a first operational condition where the waste heat from the power electronics is used to heat the battery independently or additively through a PTC heater to heat a cabin area;

wherein during the first operational condition, the power electronics loop is used to heat a battery in the battery loop while bypassing the radiator loop; and wherein when in a second operational condition, flow exiting the battery loop can have a portion directed into a radiator in the radiator loop and can have another portion directed to bypass the radiator, and wherein flow bypassing and exiting the radiator is then directed into the power electronics loop before being directed back into the battery loop.

13. The system according to claim 12, wherein when in the second operational condition:

the heater loop includes a PTC heater and a heater core, and wherein the first valve isolates the heater loop from all other loops such that the PTC heater and the heater core are directly looped together, and the first valve and the second valve cooperate with each other such that there is no flow through a battery chiller in the battery loop.

14. The system according to claim 12, wherein when in a third operational condition:

flow exiting the battery loop is sent directly into the radiator in the radiator loop, flow exiting the radiator is then sent directly into the power electronics loop, and flow exiting the power electronics loop is then fed back into the battery loop.

15. The system according to claim 14, wherein when in the third operational condition:

the heater loop includes a PTC heater and a heater core, and wherein the first valve isolates the heater loop from all other loops such that the PTC heater and the heater core are directly looped together, and the first valve and the second valve cooperate with each other such that there is no flow through a battery chiller in the battery loop.

16. The system according to claim 14, wherein when in a fourth operational condition:

flow exiting the battery loop is directed into a PTC heater in the heater loop by the first valve, flow exiting the PTC heater is directed into a heater core in the heater loop, flow exiting the heater core flows into the second valve and bypasses a radiator in the radiator loop and is directed into the power electronics loop, and flow exiting the power electronics loop is directed by the second valve into the battery loop.

17. The system according to claim 16, wherein when in the fourth operational condition:

the first valve and the second valve cooperate with each other such that there is no flow through a battery chiller in the battery loop and no flow through the radiator in the radiator loop.

18. The system according to claim 16, wherein when in a fifth operational condition:

flow exiting the battery loop is directed into the PTC heater in the heater loop by the first valve, flow exiting the PTC heater is directed into the heater core in the heater loop, flow exiting the heater core is directed into the second valve via the first valve, with the second valve subsequently directing flow into the radiator in the radiator loop, flow exiting the radiator is directed into the power electronics loop, and flow exiting the power electronics loop is directed by the second valve into the battery loop.

19. The system according to claim 18, wherein when in the fifth operational condition:

the first valve and the second valve cooperate with each other such that there is no flow through a battery chiller in the battery loop.

20. The system according to claim 18, wherein when in a sixth operational condition:

flow exiting a battery heat exchanger in the battery loop is directed into a battery chiller in the battery loop with the first valve, flow exiting the battery chiller flows into the second valve and is directed into the radiator in the radiator loop, flow exiting the radiator is directed into the power electronics loop, flow exiting the power electronics loop is directed by the second valve back into the battery loop, and the first valve isolates the heater loop from all other loops such that the PTC heater and the heater core are directly looped together.

* * * * *